United States Patent
Kodama et al.

(10) Patent No.: US 10,535,487 B1
(45) Date of Patent: Jan. 14, 2020

(54) MANUFACTURING METHOD OF ELECTRON TUBE

(71) Applicant: HAMAMATSU PHOTONICS K.K., Hamamatsu-shi, Shizuoka (JP)

(72) Inventors: Tsuyoshi Kodama, Hamamatsu (JP); Yasuyuki Kohno, Hamamatsu (JP); Shinichi Hara, Hamamatsu (JP); Kazuto Ohashi, Hamamatsu (JP)

(73) Assignee: HAMAMATSU PHOTONICS K.K., Hamamatsu-shi, Shizuoka (JP)

( * ) Notice: Subject to any disclaimer, the term of this patent is extended or adjusted under 35 U.S.C. 154(b) by 0 days.

(21) Appl. No.: 16/261,672

(22) Filed: Jan. 30, 2019

(51) Int. Cl.
| | |
|---|---|
| *H01J 9/28* | (2006.01) |
| *H01J 9/26* | (2006.01) |
| *H01J 9/18* | (2006.01) |
| *G01J 1/42* | (2006.01) |
| *H01J 31/49* | (2006.01) |

(52) U.S. Cl.
CPC ............... *H01J 9/28* (2013.01); *H01J 9/18* (2013.01); *H01J 9/26* (2013.01); *G01J 1/429* (2013.01); *H01J 31/49* (2013.01)

(58) Field of Classification Search
CPC ........ H01J 9/28; H01J 9/26; H01J 9/18; H01J 31/49; G01J 1/429
See application file for complete search history.

(56) References Cited

U.S. PATENT DOCUMENTS

| | | | |
|---|---|---|---|
| 5,500,531 A | 3/1996 | Bu | |
| 6,062,934 A * | 5/2000 | Yamaguchi | H01J 1/20 118/500 |
| 7,741,759 B2 * | 6/2010 | Sugiyama | H01J 5/24 250/207 |
| 2017/0263409 A1 * | 9/2017 | Koch | H01J 9/02 |

FOREIGN PATENT DOCUMENTS

| | | |
|---|---|---|
| JP | 3470077 B2 | 11/2003 |
| JP | 2013-19719 A | 1/2013 |

* cited by examiner

*Primary Examiner* — Donald L Raleigh
(74) *Attorney, Agent, or Firm* — Drinker Biddle & Reath LLP

(57) ABSTRACT

A first member made of an insulating material and a jig with a protrusion narrowing toward a distal end side are prepared, and at least one of the first member and the jig is heated to a temperature at which the first member can melt and deform. After the jig is brought into contact with the first member with the first member and the plurality of protrusions facing each other, the jig is removed, and an intermediate body is formed including the first member formed with a plurality of recesses, and a plurality of conductive members passing through the first member and projecting into the recesses. A second member is prepared, openings of the plurality of recesses are closed, and the second member is hermetically joined to the intermediate body to form a plurality of internal spaces where electron is emitted, and forming a joined body.

11 Claims, 15 Drawing Sheets

MANUFACTURING METHOD OF ELECTRON TUBE

TECHNICAL FIELD

One aspect of the present invention relates to a manufacturing method of an electron tube.

BACKGROUND

As a conventional technique related to a manufacturing method of an electron tube, for example, there are known the techniques described in Japanese Unexamined Patent Publication No. 2013-19719, U.S. Pat. No. 5,500,531, and Japanese Patent No. 3470077. Japanese Unexamined Patent Publication No. 2013-19719 describes a flame sensor including a lower lid provided with a cavity by etching, an upper lid joined to the lower lid so as to close the cavity, and an electrode disposed in the cavity. U.S. Pat. No. 5,500,531 describes a discharge type sensor for detecting ultra-violet rays, including a silicon substrate having a cavity formed by etching, a glass substrate provided on the silicon substrate, and an electrode provided in the cavity.

Japanese Patent No. 3470077 describes a discharge light-emitting device including a substrate and a transparent substrate that are stacked on each other, and an internal electrode and an external electrode that is formed on the substrate and the transparent substrate. In the discharge light-emitting device described in Japanese Patent No. 3470077, a discharging space is formed between the substrate and the transparent substrate.

SUMMARY

In recent years, as a manufacturing method of an electron tube as described above, for example, a method capable of easily manufacturing an internal structure of the electron tube is required while application of the electron tube to various fields has expanded.

One aspect of the present invention is to provide a manufacturing method of an electron tube that can easily manufacture an internal structure of the electron tube.

The manufacturing method of an electron tube according to the present invention includes: a first step of preparing a first member made of an insulating material and a jig provided with a juxtaposed protrusion narrowing toward a distal end side and removably holding a conductive member, and heating at least one of the first member and the jig to a temperature at which the first member can melt and deform; after the first step, a second step of bringing the jig into contact with the first member to allow the plurality of protrusions to be embedded in the first member in a state where the first member and the plurality of protrusions are facing each other, removing the jig, and forming an intermediate body that includes the first member in which a plurality of recesses expanding toward an opening side are formed corresponding to the plurality of protrusions, and includes a plurality of the conductive members passing through the first member and projecting into the recesses; and after the second step, a third step of preparing a second member, hermetically joining the second member to the intermediate body by closing openings of the plurality of recesses to form a plurality of internal spaces where electron is emitted, and forming a joined body.

In this manufacturing method of an electron tube, it is possible to collectively mold, with use of a jig, a plurality of recesses in which a conductive member passing through the first member projects, and collectively manufacture an internal structure having an internal space formed by the recess. That is, the internal structure of the electron tube can be easily manufactured.

A manufacturing method of an electron tube according to one aspect of the present invention may further include, after the third step, a fourth step of cutting the joined body into a plurality of electron tubes so as to have at least one internal space. In this case, it is possible to stably manufacture a plurality of electron tubes having a predetermined internal structure.

In a manufacturing method of an electron tube according to one aspect of the present invention, a side surface of a protrusion of the jig may be continuously inclined such that the protrusion narrows toward the distal end side. In this case, it is possible to release the jig while suppressing breakage of the first member and the jig, and to stably manufacture the internal structure of the electron tube.

In a manufacturing method of an electron tube according to one aspect of the present invention, the protrusion of the jig may have a holding recess that holds, in a state where one end side of the conductive member projects from the protrusion, another end side of the conductive member, and a gap may be formed at least in a part between another end side of the conductive member held in the holding recess and a side surface of the holding recess. In this case, since the conductive member can be covered by filling the first member in the gap, it is possible to stably fix the conductive member even when the conductive member is projected.

In a manufacturing method of an electron tube according to one aspect of the present invention, another end side of the conductive member held in the holding recess may have an enlarged part expanding toward the another end side, and a gap may be formed at least in a part between the enlarged part and a side surface of the holding recess. In this case, since the enlarged part can be covered by filling the first member in the gap, a contact area between the conductive member and the first member can be enlarged. Therefore, even when the conductive member is projected, it is possible to stably fix the conductive member.

In a manufacturing method of an electron tube according to one aspect of the present invention, a side surface of the enlarged part may be continuously inclined such that the conductive member expands toward another end side of the conductive member. In this case, it is easy to cover the side surface of the enlarged part with the first member without a gap.

In a manufacturing method of an electron tube according to one aspect of the present invention, an area around the protrusion of the jig may removably hold the power supply member; in the second step, the jig may be brought into contact with the first member such that the power supply member is further embedded in the first member, to form an intermediate body further including the power supply member; and in the third step, a counter electrode member may be provided on the second member so as to face the conductive member projecting into the recess, and the counter electrode member may be electrically connected to the power supply member. In this case, it becomes possible to form a power supply path to the counter electrode member on the second member side without requiring a separate step.

In a manufacturing method of an electron tube according to one aspect of the present invention, the second member may be made of an insulating material. In this case, it becomes possible to improve the withstand voltage capability in the internal space of the manufactured electron tube.

In a manufacturing method of an electron tube according to one aspect of the present invention, at least one of a recess, a protrusion, or a rough surface part may be formed on at least a part of a surface constituting the protrusion of the jig. In this case, at least one of a recess, a protrusion, or a rough surface part can be formed on a surface constituting the internal space, and a creeping distance in the internal space can be lengthened.

In a manufacturing method of an electron tube according to one aspect of the present invention, after the first step, there may be further provided a step of pressing, with a pressing member, a side opposite to a side to be in contact with the jig in the first member, and at least one of a recess, a protrusion, or a rough surface part may be formed in a contact region of the pressing member with the first member. In this case, at least one of a recess, a protrusion, or a rough surface part can be formed on an outer surface of the first member, and a creepage distance on an outer surface of the electron tube can be lengthened.

In a manufacturing method of an electron tube according to one aspect of the present invention, in the second step, the conductive member may be embedded in the first member while exposing one end of the conductive member from the first member such that the conductive member passes through the first member in the intermediate body, or the first member may be polished until one end of the conductive member is exposed from the first member. In this case, a configuration in which the conductive member passes through the first member can be concretely realized.

DETAILED DESCRIPTION

Figure 1:
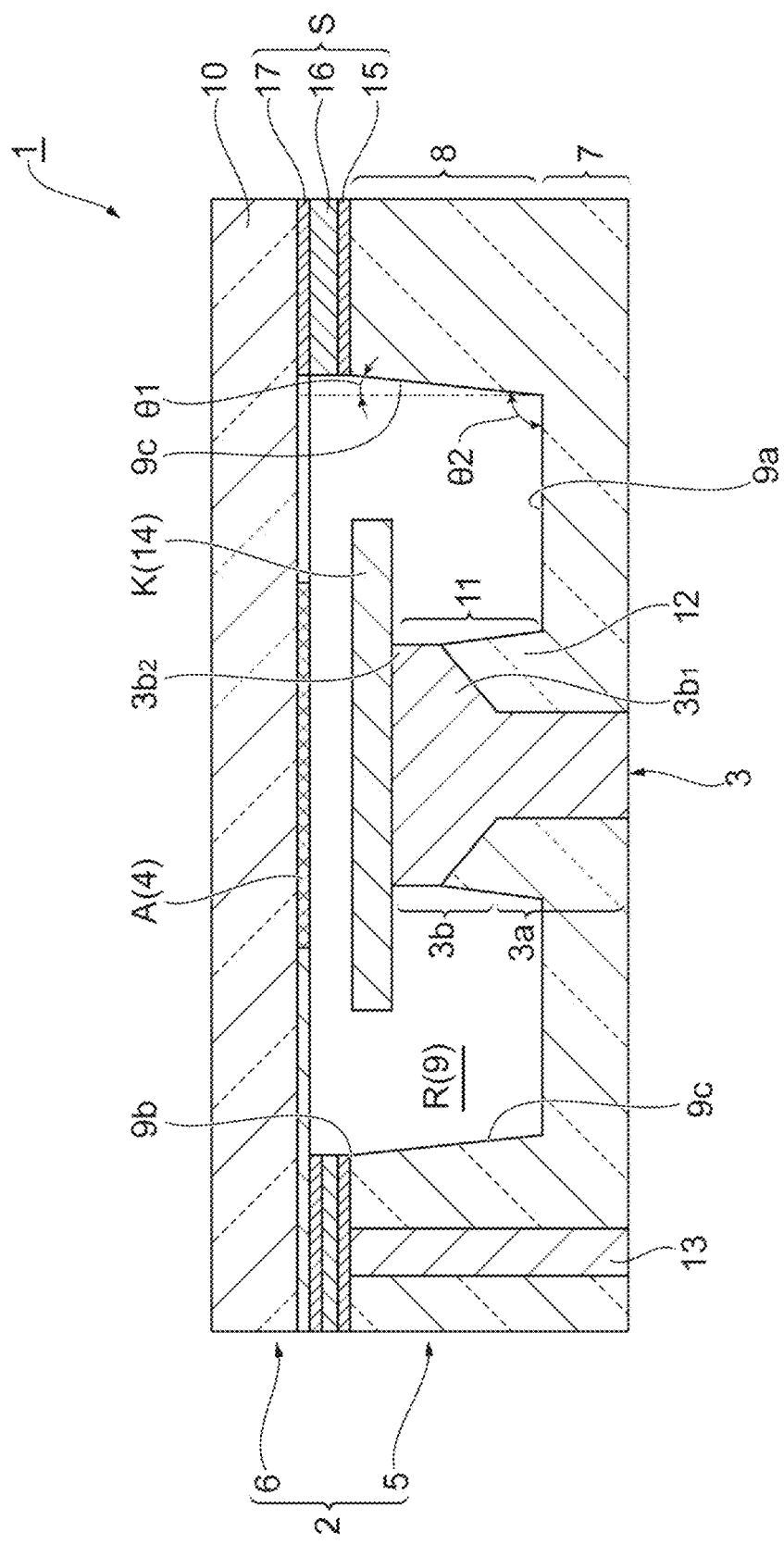
FIG. 1 is a cross-sectional view of an electron tube according to a first embodiment.

Hereinafter, one embodiment will be described in detail with reference to the drawings. In the following description, the same reference numerals are used for the same or corresponding elements, and redundant explanations are omitted. Further, dimensions in the following description do not necessarily correspond to the drawings.

First Embodiment

Figure 2:
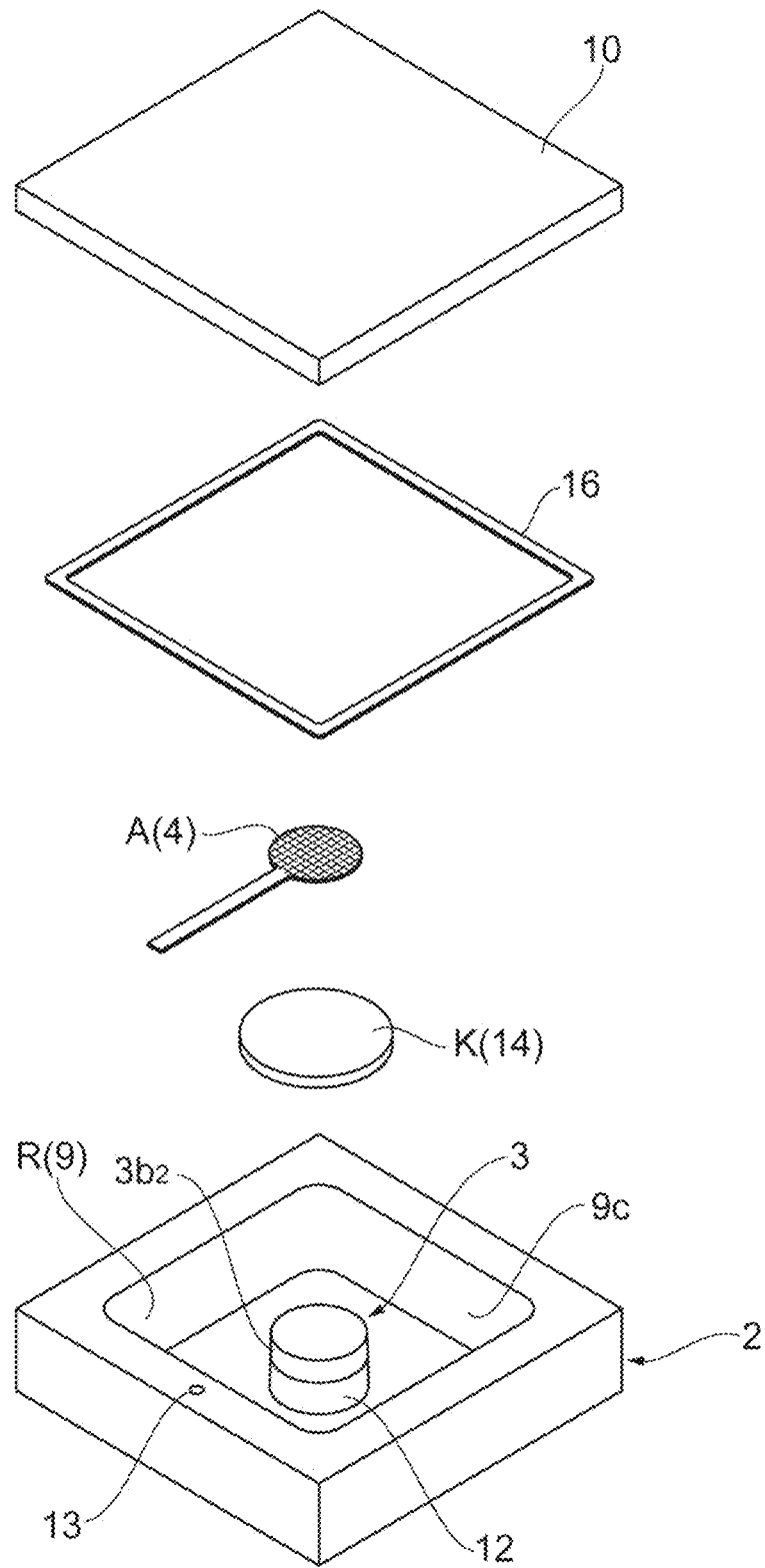
FIG. 2 is an exploded perspective view of the electron tube of FIG. 1.

As shown in FIGS. 1 and 2, an electron tube 1 is a discharge tube serving as a light receiving element (energy detecting element) in which a discharge gas such as neon or hydrogen is enclosed. The electron tube 1 is used as an ultraviolet detector (flame sensor) that detects ultraviolet rays with use of photoelectron emission effect and discharge phenomenon. The electron tube 1 includes a housing 2 having an internal space R airtightly sealed, and a cathode K and an anode A as electrodes for reception of light in the internal space R. The electron tube 1 has an outer shape of a rectangular parallelepiped and has dimensions of 10 mm×10 mm×5 mm, for example.

The housing 2 has a main body part 5 and a lid part 6. The housing 2 has a structure in which the main body part 5 and the lid part 6 are hermetically joined by a sealing part S, and a discharge gas is enclosed in the internal space R. The main body part 5 is made of an insulating material and is formed of, for example, quartz, glass, ceramics, or the like. The main body part 5 includes a first plate-shaped part 7 and a side wall part 8 provided on the first plate-shaped part 7. The first plate-shaped part 7 has a rectangular flat plate shape. A thickness of the first plate-shaped part 7 is, for example, 1 mm. The side wall part 8 is erected on an edge of the first plate-shaped part 7 and has a rectangular frame shape. In the main body part 5, a recess 9 constituting the internal space R is formed by a region surrounded by the side wall part 8. In the internal space R, electron emission is performed.

The recess 9 expands from a bottom surface 9a thereof (an inner surface of the first plate-shaped part 7) toward an opening 9b side. The recess 9 is space having a truncated square shape. A depth of the recess 9 is, for example, 2.5 mm. The opening 9b of the recess 9 has, for example, a rectangular shape of 7 mm×7 mm. Four side surfaces 9c of the recess 9 are inclined continuously (so as to form a smooth surface) such that the recess 9 expands toward the opening 9b side. An inclination angle θ1 of the side surface 9c when a direction orthogonal to the bottom surface 9a is set to a reference(0°) may be 3° to 10°, or may be 5°. In other words, when the electron tube 1 is viewed in a cross section along an erecting direction of the side wall part 8 (when seeing FIG. 1 from a direction perpendicular to the page), an angle θ2 formed by the bottom surface 9a and the side surface 9c may be 93° to 100°, or may be 95°.

The lid part 6 is airtightly joined to the main body part 5 by the sealing part S so as to close the opening 9b of the recess 9. The internal space R is defined by an inner surface of the lid part 6, the sealing part S, and the bottom surface 9a and the side surface 9c of the recess 9. The lid part 6 is made of an insulating material having light transmittance (ultraviolet ray transmittance, energy transmittance), and is formed of, for example, quartz, ultraviolet transmissive glass, or the like. The lid part 6 includes a second plate-shaped part 10 (here, the lid part 6 is the second plate-shaped part 10). The second plate-shaped part 10 has a rectangular flat plate shape. A thickness of the second plate-shaped part 10 is, for example, 1 mm. The second plate-shaped part 10 is fixed on the side wall part 8 and faces the first plate-shaped part 7. Between the second plate-shaped part 10 and the side wall part 8, a first base film 15, a sealing material 16, and a second base film 17 constituting the sealing part S are interposed in this order from the side wall part 8 to the second plate-shaped part 10. Note that FIG. 2 is illustrated with the first base film 15 and the second base film 17 omitted.

The first base film 15 is a film to improve adhesiveness between the sealing material 16 and the side wall part 8. The second base film 17 is a film to improve adhesiveness between the sealing material 16 and the second plate-shaped part 10. As the first base film 15 and the second base film 17, chromium (Cr)/nickel (Ni), titanium (Ti)/platinum (Pt)/gold (Au), or the like can be used. The sealing material 16 is a member to hermetically seal between the side wall part 8 and the second plate-shaped part 10. As the sealing material 16, indium (In), a brazing filler metal such as gold tin (AuSn), frit glass, or the like can be used. The first base film 15, the sealing material 16, and the second base film 17 have a rectangular frame shape provided on a periphery of the recess 9 when viewed from the opening 9b side of the recess 9.

The cathode (electrode) K includes a photoelectron emitting part 14 described later. The photoelectron emitting part 14 is held at a distal end of a penetrating member 3, to be disposed at a desired position in the internal space R and electrically connected to the penetrating member 3. The photoelectron emitting part 14 serves as a photoelectron emitting electrode when a desired potential is applied through the penetrating member 3.

The penetrating member 3 is a conductive member passing through the first plate-shaped part 7 of the main body part 5. The penetrating member 3 is made of, for example, Kovar metal. The penetrating member 3 has, on a base end side thereof, a columnar part 3a extending substantially in a cylindrical shape with a substantially constant diameter. The penetrating member 3 has, on a distal end side thereof, a large-diameter part 3b having a diameter larger than that of the columnar part 3a. A base end side of the large-diameter part 3b has an enlarged part 3b₁ enlarged in diameter (expanding) toward a distal end side. The distal end side from the enlarged part 3b₁ is a cylindrical holding part 3b₂ that holds, on a distal end face thereof, the photoelectron emitting part 14. Further, a length of the columnar part 3a is larger than a thickness of the first plate-shaped part 7.

The penetrating member 3 is exposed in an external space (a space outside the electron tube 1) at a base end side (base end face) of the columnar part 3a so as to be flush with an outer surface of the first plate-shaped part 7, and fixed to the first plate-shaped part 7 such that the large-diameter part 3b and a part of the distal end side of the columnar part 3a project into the internal space R from the bottom surface 9a of the recess 9 toward the lid part 6 side. That is, the penetrating member 3 has an internal space projecting part 11 projecting into the internal space R from a central part of the bottom surface 9a of the recess 9, and the internal space projecting part 11 is formed by the large-diameter part 3b and a part of the distal end side of the columnar part 3a. Further, the internal space projecting part 11 has the enlarged part 3b₁ enlarged in diameter (expanding) toward the distal end side, and the enlarged part 3b₁ is formed by a part of the base end side of the large-diameter part 3b.

A side surface of the enlarged part 3b₁ is inclined continuously (so as to form a smooth surface) such that the penetrating member 3 expands toward the distal end side. The enlarged part 3b₁ has a truncated cone shape. A distal end side of the internal space projecting part 11 from the enlarged part 3b₁ is the holding part 3b₂. The holding part 3b₂ is formed by a part of the distal end side of the large-diameter part 3b. The holding part 3b₂ has a diameter equal to or larger than that of the enlarged part 3b₁, and the enlarged part 3b₁ has a larger diameter than that of on the base end side (the diameter of the columnar part 3a) from the enlarged part 3b₁. That is, in the internal space projecting part 11, the diameter of the holding part 3b₂, which is the distal end side from the enlarged part 3b₁, is larger than the diameter on the base end side (the diameter of the columnar part 3a) from the enlarged part 3b₁. For example, the diameter of the holding part 3b₂ of the penetrating member 3 is φ2 mm, the diameter of the base end side (the diameter of the columnar part 3a) from the enlarged part 3b₁ is φ1 mm, and a total length of the penetrating member 3 is 3 mm. Such a penetrating member 3 has a mushroom shape, and it can also be said that the enlarged part 3b₁ and the holding part 3b₂, which are a cap portion of the mushroom shape, mainly project into the internal space R.

On a distal end face of the holding part 3b₂, the disc-shaped photoelectron emitting part 14 serving as a photoelectron emission electrode is joined coaxially with the penetrating member 3. Unlike the penetrating member 3, in the photoelectron emitting part 14, it is not necessary to consider adhesiveness with the main body part 5 and the like. Therefore, as a material of the photoelectron emitting part 14, a material focusing on a photoelectric conversion efficiency can be selected. For example, the photoelectron emitting part 14 is made of Ni (nickel). The photoelectron emitting part 14 has a dimension of φ4 mm and a thickness of 0.3 mm, for example.

A periphery of the enlarged part $3b_1$ and a portion on the base end side from the enlarged part $3b_1$ (a part of the distal end side of the columnar part 3a) in the internal space projecting part 11 are covered with an insulating part 12. In other words, sides of the internal space projecting part 11 other than the holding part $3b_2$ are surrounded by the insulating part 12. The insulating part 12 is made of an insulating material, and is formed of, for example, quartz, glass, ceramics, or the like. The insulating part 12 of the present embodiment is formed integrally with the first plate-shaped part 7 of the main body part 5. An outer peripheral surface of the insulating part 12 forms a side surface of a truncated cone, and is inclined continuously (so as to form a smooth surface) so as to decrease in diameter from the bottom surface 9a of the recess 9 toward the opening 9b side.

The anode (another electrode) A includes a counter electrode (counter electrode member) 4. The counter electrode 4 is provided on the lid part 6 so as to face the penetrating member 3 and the photoelectron emitting part 14. The counter electrode 4 is, for example, a mesh-shaped electrode provided with an opening through which light transmitted through the lid part 6 can pass. The counter electrode 4 faces the photoelectron emitting part 14 on the penetrating member 3 with a distance of a predetermined length. The predetermined length is, for example, a length obtained by adding, to 0.2 mm, respective thicknesses of the first base film 15, the sealing material 16, and the second base film 17. The counter electrode 4 is formed on the inner surface of the lid part 6 by vapor deposition. The counter electrode 4 is a metal film such as aluminum (Al) or Cr. The counter electrode 4 is electrically connected to a power supply part 13.

The power supply part 13 is a member to supply power to the counter electrode 4. The power supply part 13 is made of a conductive material. The power supply part 13 passes through the main body part 5 without being exposed in the internal space R. Specifically, the power supply part 13 has a substantially cylindrical shape having a substantially constant diameter and extending with a depth direction of the recess 9 as an axial direction. The power supply part 13 is buried inside the first plate-shaped part 7 and the side wall part 8, and passes through without being exposed in the internal space R. The power supply part 13 is provided on the periphery of the recess 9 in the main body part 5. The power supply part 13 is formed of, for example, Kovar metal. A distal end (distal end face) on the opening 9b side of the power supply part 13 is exposed at an end face on the lid part 6 side of the side wall part 8 so as to be flush with the end face, and is electrically connected to the counter electrode 4 via the first base film 15, the sealing material 16, and the second base film 17. Whereas, a base end (base end face) on the first plate-shaped part 7 side of the power supply part 13 is exposed so as to be flush with the outer surface of the first plate-shaped part 7 in the outer space (space outside the electron tube 1).

An operation principle of the electron tube 1 configured as described above will be described. Here, a description will be given to an aspect in which, in a use state of the electron tube 1, a negative voltage is applied to the cathode K (photoelectron emitting part 14) by supplying a negative voltage to the penetrating member 3, and a signal is taken out from the anode A (counter electrode 4) having a ground potential by connecting the power supply part 13 to the ground potential. As described above, in a state where a voltage is applied between the cathode K (photoelectron emitting part 14) and the anode A (counter electrode 4), when ultraviolet rays are incident on the cathode K (photoelectron emitting part 14) through an opening of the lid part 6 and the counter electrode 4, photoelectrons are emitted from the cathode K (photoelectron emitting part 14) (photoelectron emission effect). When the photoelectrons are attracted to the anode A (counter electrode 4) by an electric field formed by the voltage applied between the cathode K (photoelectron emitting part 14) and the anode A (counter electrode 4), the photoelectrons collide with discharge gas molecules in the internal space R to ionize the discharge gas molecules. Among electrons and positive ions generated by ionization, electrons further repeat collision and ionization with other discharge gas molecules to generate secondary electrons and reach the anode A (counter electrode 4). Whereas, positive ions are accelerated toward the cathode K (photoelectron emitting part 14), and when the positive ions are incident on the cathode K (photoelectron emitting part 14), electrons are emitted from the cathode K (photoelectron emitting part 14). Then, when the electrons are attracted to the anode A (counter electrode 4), the electrons collide with the discharge gas molecules in the internal space R to ionize the discharge gas molecules. Repetition of such electron multiplication causes space discharge, and causes a large current to abruptly flow between the cathode K (photoelectron emitting part 14) and the anode A (counter electrode 4). By detecting the current with the anode A (counter electrode 4), ultraviolet rays can be detected. Thus, in the electron tube 1, ultraviolet rays are detected with use of the photoelectric emission effect and the discharge phenomenon.

Figure 3:
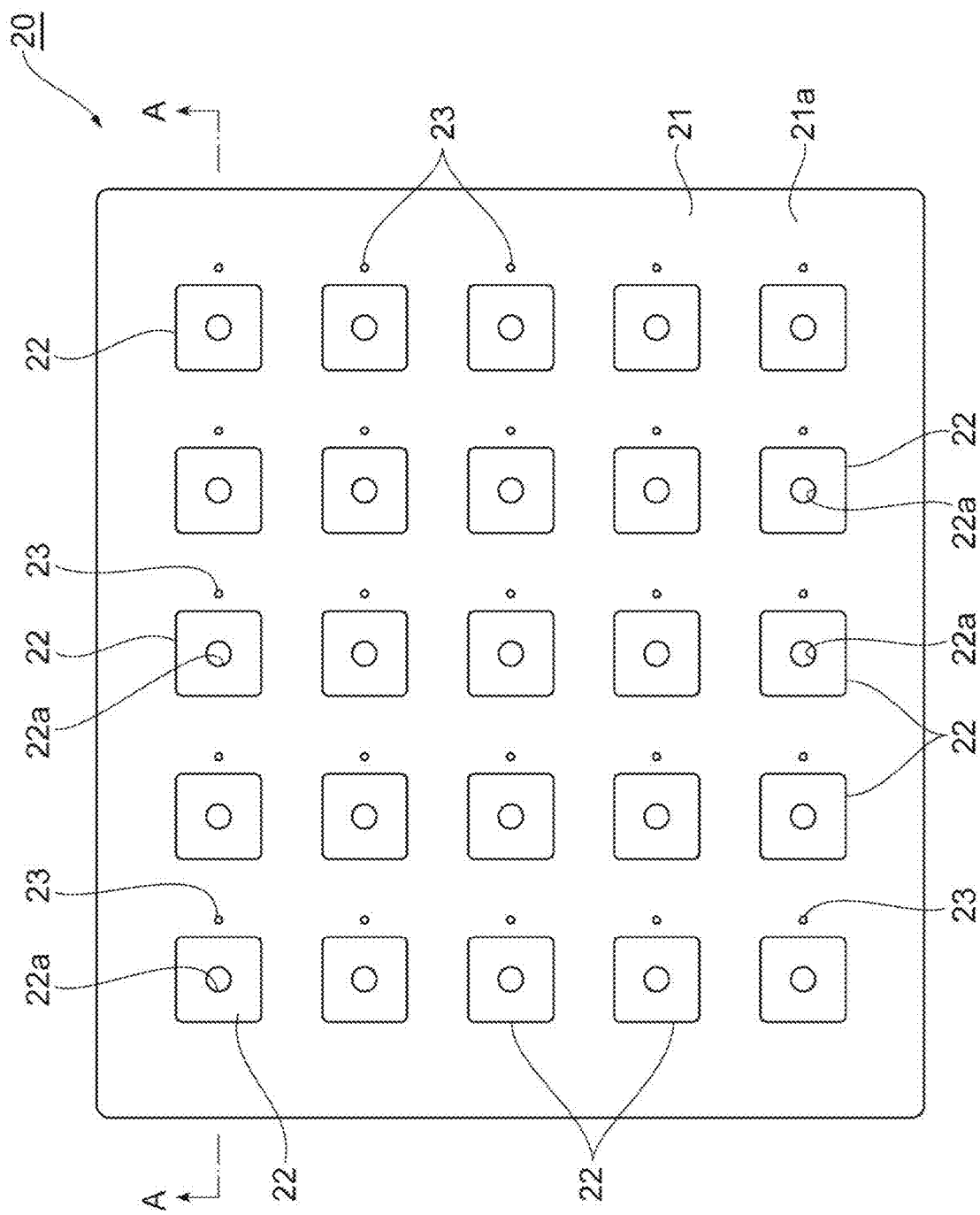
FIG. 3 is a plan view of a jig used in a manufacturing method of the electron tube of FIG. 1.

Next, a manufacturing method for manufacturing the electron tube 1 will be described with reference to FIGS. 3 to 8B. FIGS. 4 to 8B illustrate merely a part of a cross section corresponding to the cross section taken along the line A-A of FIG. 3 (merely a region corresponding to one electron tube 1), and, as shown in FIG. 3, for example, 25 pieces of five rows and five columns of the electron tube 1 are actually manufactured collectively. Further, in the description of the manufacturing method, the base end of the penetrating member (conductive member) 3 and the power supply part 13 is defined as one end, and the distal end is defined as another end.

Figure 4A:
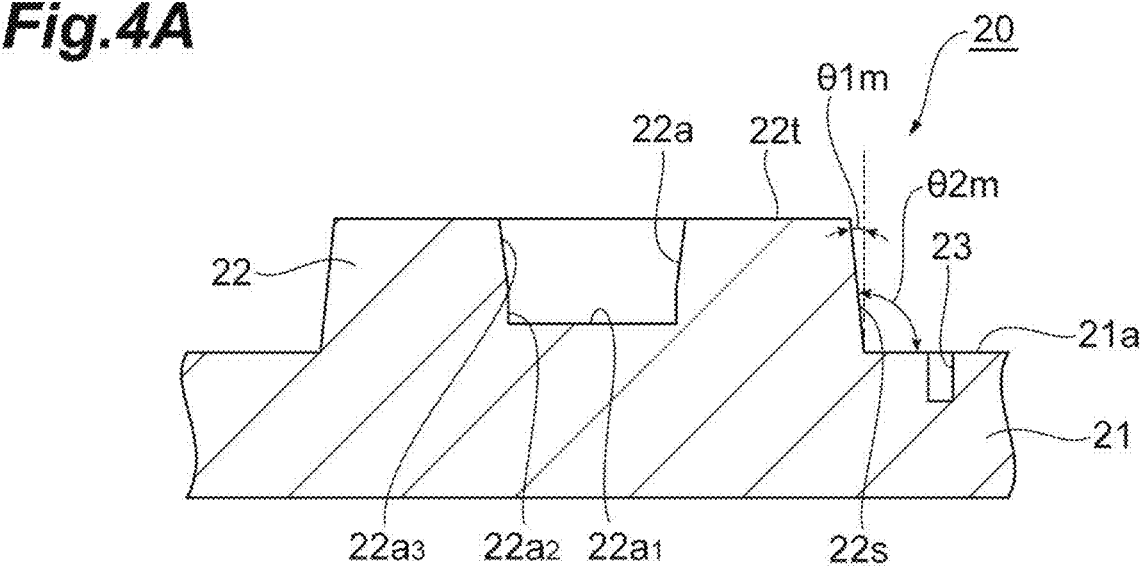
FIG. 4A is a partial cross-sectional view illustrating the manufacturing method of the electron tube of FIG. 1.

First, as shown in FIGS. 3 and 4A, a jig 20 is prepared. The jig 20 is a mold to shape the main body part 5. The jig 20 includes a flat plate part 21, a protrusion 22 arranged in a matrix shape on a surface 21a of the flat plate part 21, and a hole 23 formed around each protrusion 22 in the flat plate part 21.

The protrusion 22 has a shape corresponding to the recess 9. The protrusion 22 has a truncated square shape narrowing toward a top surface 22t of a distal end. A side surface 22s of the protrusion 22 is inclined continuously (so as to form a smooth surface) such that the protrusion 22 narrows toward the distal end side. The top surface 22t corresponds to the bottom surface 9a of the recess 9, and the side surface 22s corresponds to the side surface 9c of the recess 9. An inclination angle θ1m of the side surface 22s of the protrusion 22 when a direction orthogonal to the surface 21a is set to the reference (0°) may be 3° to 10°, or may be or 5°. In other words, when the jig 20 is viewed in a cross section along an erecting direction of the protrusion 22 (when seeing FIG. 4A from a direction perpendicular to the page), an angle θ2m formed by the surface 21a and the side surface 22s may be 93° to 100°, or may be 95°. The protrusion 22 has a holding recess 22a that holds the penetrating member 3 in a substantially central region on an upper surface.

In a state where one end side of the columnar part 3a of the penetrating member 3 projects from the protrusion 22, the holding recess 22a is inserted with and holds another end side of the columnar part 3a and the large-diameter part 3b of the penetrating member 3. A depth of the holding recess 22a is smaller than a projecting height of the protrusion 22. A bottom surface $22a_1$ side of the holding recess 22a has a cylindrical shape formed by the bottom surface $22a_1$ and a side surface $22a_2$, corresponding to the holding part $3b_2$, which is another end side of the large-diameter part 3b. An opening side of the holding recess 22a has a truncated cone shape enlarged in diameter toward the opening side, and is formed by a side surface $22a_3$. That is, the side surface $22a_3$ on the opening side of the holding recess 22a is inclined continuously (so as to form a smooth surface) such that the holding recess 22a expands toward the opening side. The hole 23 is formed at a position close to each protrusion 22 on the surface 21a of the flat plate part 21. A same number of the holes 23 as that of the protrusions 22 are formed so as to be paired with the protrusions 22. The hole 23 holds an end of the power supply part (power supply member) 13. The hole 23 has a cylindrical shape corresponding to the power supply part 13.

Figure 4B:
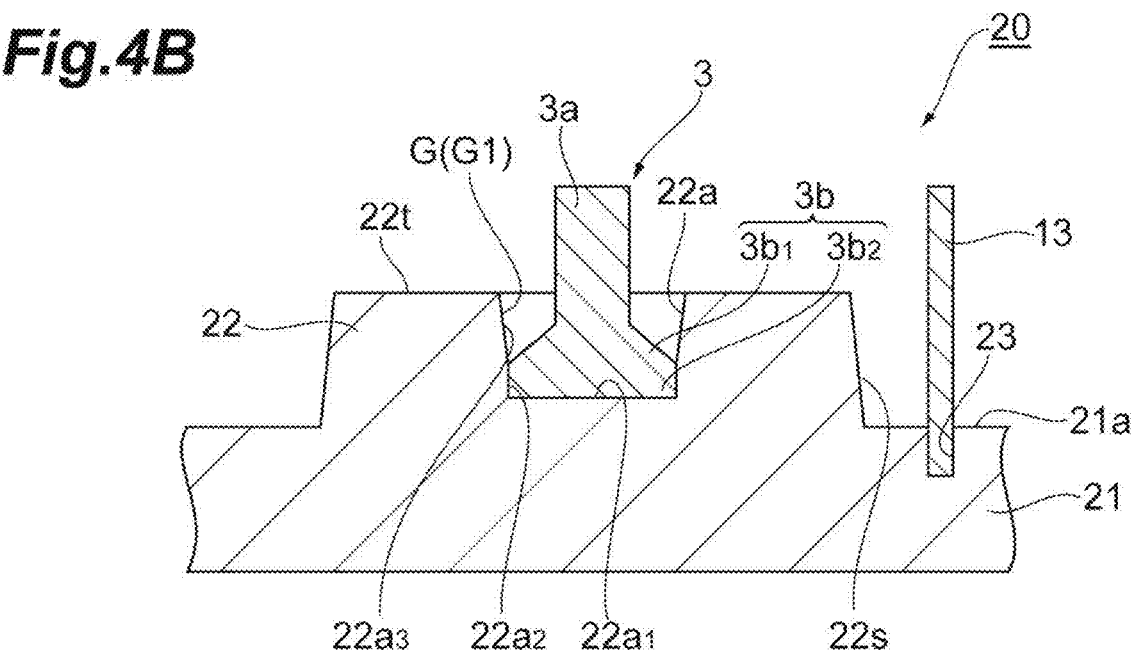
FIG. 4B is a partial cross-sectional view showing a continuation of FIG. 4A.

In a state where the jig 20 is placed on a placing table (not shown), as shown in FIG. 4B, the penetrating member 3 is coaxially inserted into the holding recess 22a of the jig 20 with the holding part $3b_2$, which is another end side of the penetrating member 3, being a bottom side. That is, by supporting another end face of the holding part $3b_2$ of the penetrating member 3 with the bottom surface $22a_1$ of the holding recess 22a, the penetrating member 3 is arranged so as to erect in the holding recess 22a at another end side. Further, since a side surface of the holding part $3b_2$ is also supported by the side surface $22a_2$ of the holding recess 22a, the penetrating member 3 is held more stably in the holding recess 22a. This allows the penetrating member 3 to be removably held by the holding recess 22a. Additionally, another end side of the power supply part 13 is coaxially inserted into the hole 23 of the jig 20, and the power supply part 13 is arranged so as to erect in the hole 23 at another end side. This allows the power supply part 13 to be removably held by the hole 23. At this time, one end faces of the penetrating member 3 and the power supply part 13, that is, the end faces on a side projecting from the jig 20 are positioned substantially at the same position in axial directions of the penetrating member 3 and the power supply part 13. Between the penetrating member 3 and the side surface of the holding recess 22a, a gap G is formed. The gap G is a space present around the penetrating member 3 in the holding recess 22a. The gap G includes a gap G1 between the enlarged part $3b_1$ and an inner surface of the holding recess 22a. In practice, there is also a slight gap between the holding recess 22a and the holding part $3b_2$ in order to removably hold the penetrating member 3 with the holding recess 22a, but this gap is not included in the gap G.

Figure 5A:
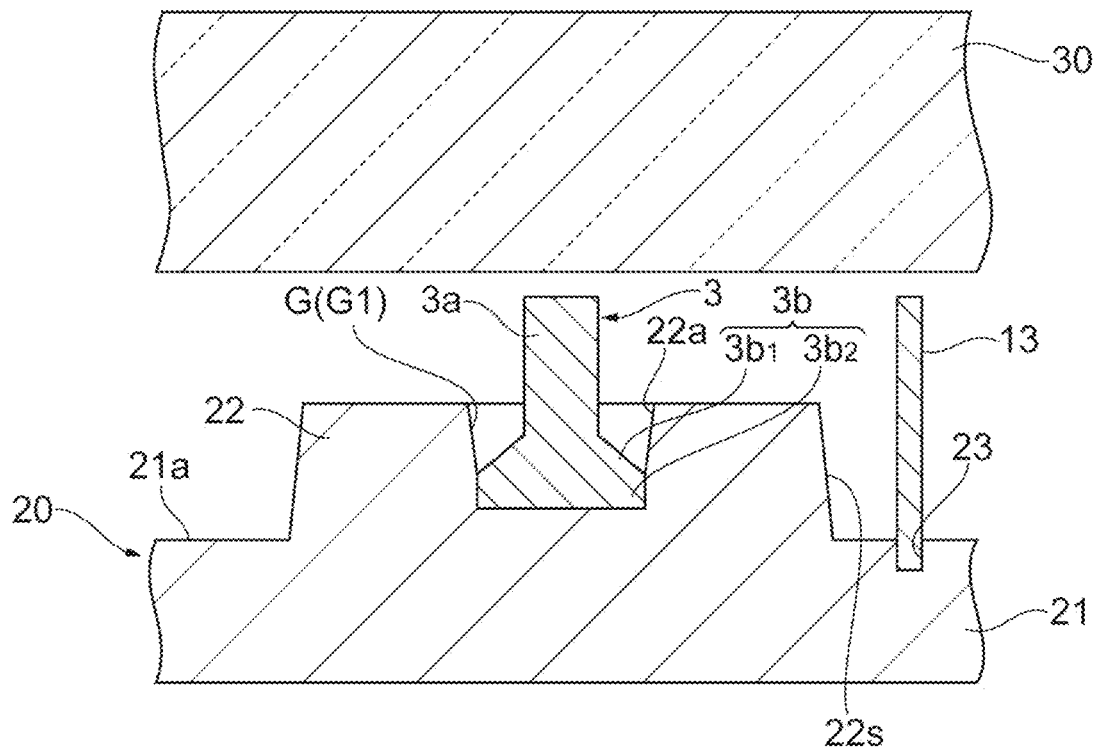
FIG. 5A is a partial cross-sectional view showing a continuation of FIG. 4B.

In addition to preparing such a jig 20, as shown in FIG. 5A, a first member 30 made of an insulating material such as glass is prepared. The first member 30 has a flat plate shape and has dimensions of 80 mm×80 mm×4 mm, for example. The size of the first member 30 includes a cutting margin in a cutting step to be described later.

In a state where the first member 30 is held by a holding member (not shown), the first member 30 is disposed at a position facing the jig 20 holding the penetrating member 3 and the power supply part 13, and the first member 30 and a plurality of protrusions 22 are opposed to each other. Then, at least one (here, both) of the jig 20 and the first member 30 is heated to a temperature at which the first member 30 can melt and deform. For example, the jig 20 and the first member 30, including the placing table and the holding member, are disposed in a temperature atmosphere in which the first member 30 can melt and deform. Therefore, the jig 20, the placing table, and the holding member are made of a material excellent in stability at high temperature without melting and deformation even at a temperature at which the first member 30 can melt and deform. In a case where the first member 30 is made of glass, the temperature at which the first member 30 can melt and deform is, for example, a temperature equal to or higher than the glass transition point.

Figure 5B:
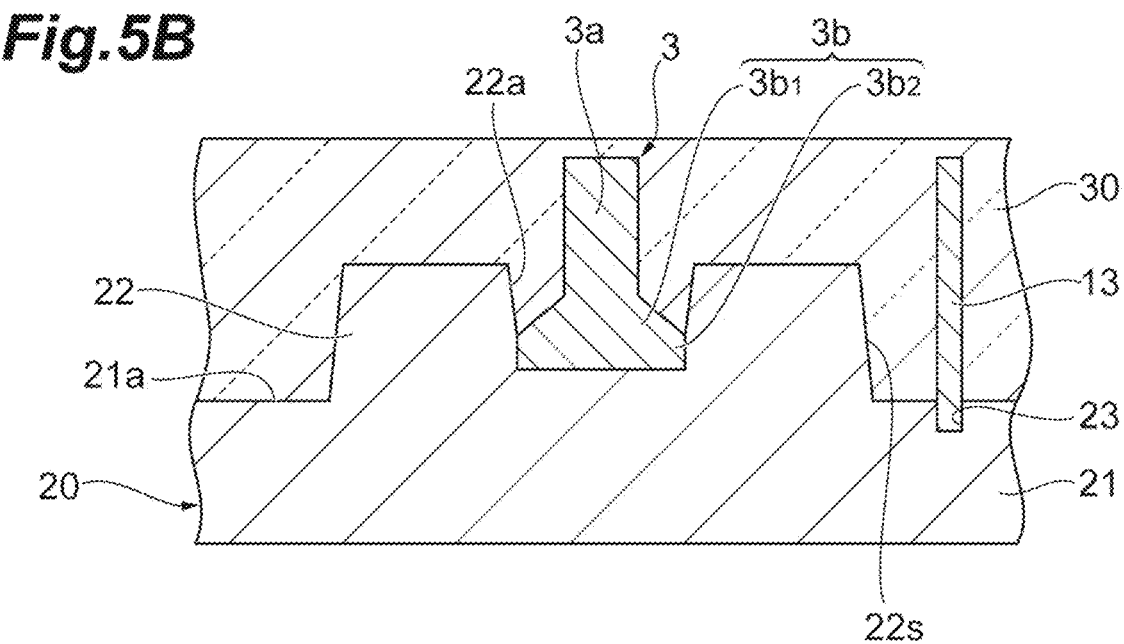
FIG. 5B is a partial cross-sectional view showing a continuation of FIG. 5A.
Figure 6A:
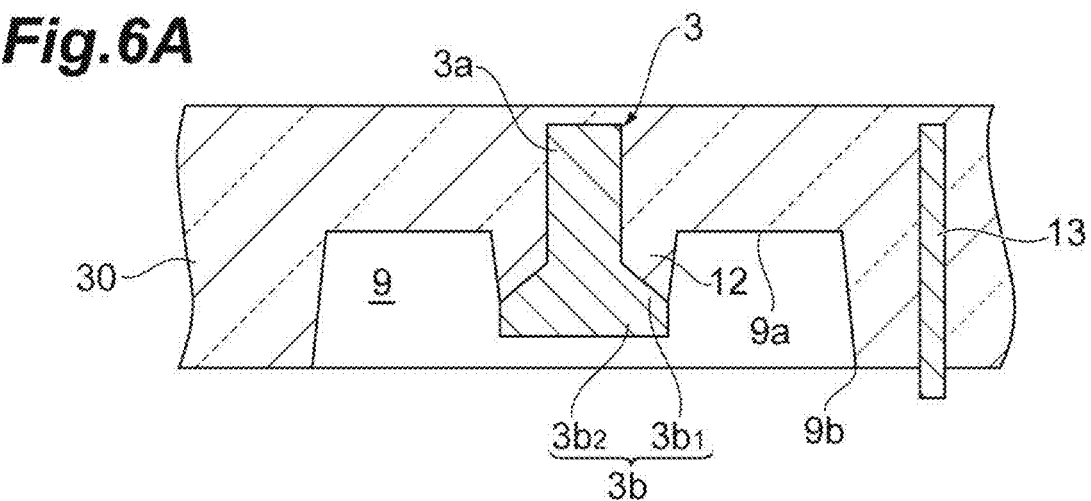
FIG. 6A is a partial cross-sectional view showing a continuation of FIG. 5B.

Subsequently, as shown in FIG. 5B, in a state where the first member 30 and the plurality of protrusions 22 are facing each other, the plurality of protrusions 22, the penetrating member 3, and the power supply part 13 are embedded in the first member 30, by bringing the jig 20 and the first member 30 close to and into contact with each other to press either one of the jig 20 and the first member 30 against the other (or each other). At that time, the first member 30 also flows into and fills the gap G including the gap G1 around the enlarged part $3b_1$. Since the first member 30 hardly flows between the side surface of the holding part $3b_2$ and the side surface $22a_2$, the first member 30 does not flow at least in between another end face of the holding part $3b_2$ and the bottom surface $22a_1$. That is, at least another end face of the holding part $3b_2$ of the penetrating member 3 is not covered with the insulating material. Therefore, it is possible to reliably secure electrical connection with the photoelectron emitting part 14 at a time of joining with the photoelectron emitting part 14 described later. Further, here, up to one end faces of the penetrating member 3 and the power supply part 13 are embedded in the first member 30 so as to be buried (such that one end faces are not exposed from the first member 30). Thereafter, as shown in FIG. 6A, the jig 20 is removed (released). In other words, the first member 30, the penetrating member 3, and the power supply part 13 are taken out from the jig 20.

Figure 6B:
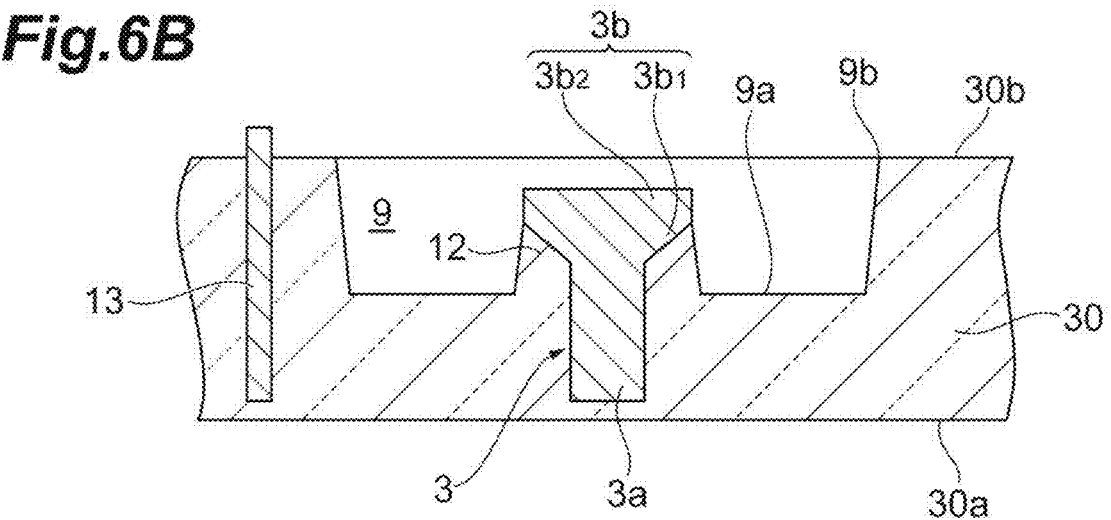
FIG. 6B is a partial cross-sectional view showing a continuation of FIG. 6A.

Subsequently, as shown in FIG. 6B, the first member 30, the penetrating member 3, and the power supply part 13 are arranged upside down such that a direction of the opening 9b of the recess 9 is changed by 180°. Note that this step of arranging upside down is a step for the sake of convenience of explanation, and may be omitted in an actual manufacturing step.

Figure 6C:
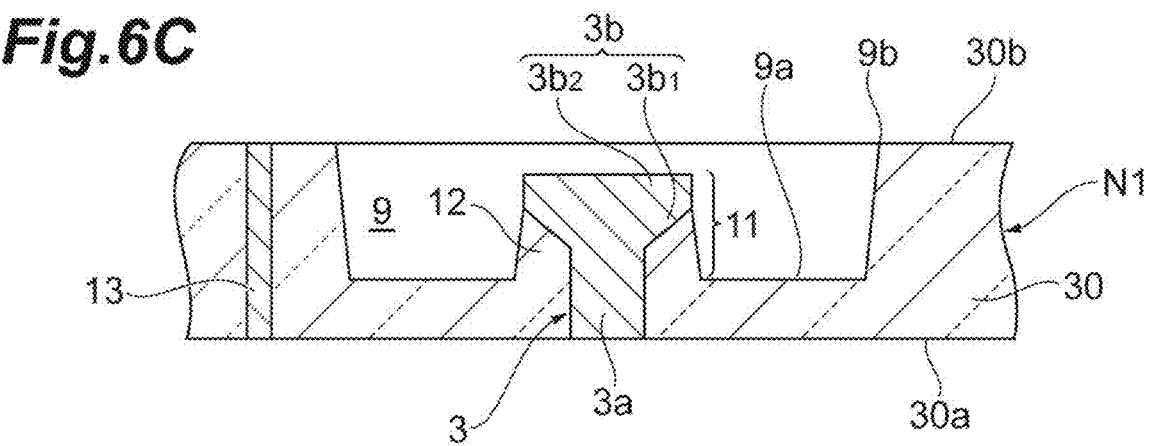
FIG. 6C is a partial cross-sectional view showing a continuation of FIG. 6B.

Subsequently, as shown in FIG. 6C, a surface 30a of the first member 30 on a side opposite to the opening 9b side of the recess 9 is polished until one ends of the penetrating member 3 and the power supply part 13 are exposed from the surface 30a. Similarly, another end of the power supply part 13 is polished so as to be flush with a surface 30b on the opening 9b side of the recess 9 in the first member 30. Thereby, an intermediate body N1 is foamed.

The intermediate body N1 includes: the first member 30 in which a plurality of recesses 9 expanding toward the opening 9b side are formed corresponding to the plurality of protrusions 22; a plurality of penetrating members 3 passing through the first member 30 and projecting into the recesses 9; and a plurality of power supply parts 13 passing through the periphery of the recesses 9 of the first member 30. In the present embodiment, "a plurality of" corresponds to, for example, 25 pieces of five rows and five columns as described above. The internal space projecting part 11 is formed by a portion inserted into the holding recess 22a in the penetrating member 3, that is, the large-diameter part 3b (the enlarged part $3b_1$ and the holding part $3b_2$) and a part of another end side of the columnar part $3a$. The insulating part 12 is formed by the first member 30 filled in the gap G (see FIG. 5A) including the gap G1 around the enlarged part $3b_1$.

Figure 7A:
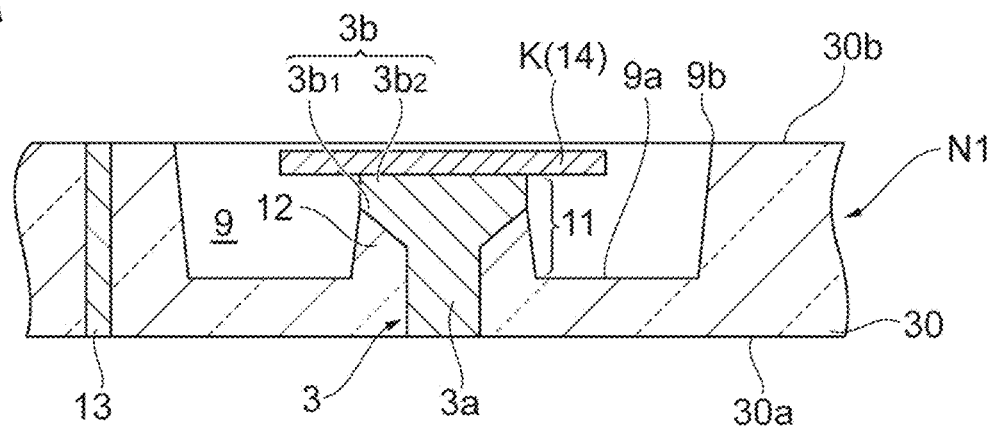
FIG. 7A is a partial cross-sectional view showing a continuation of FIG. 6C.
Figure 7B:
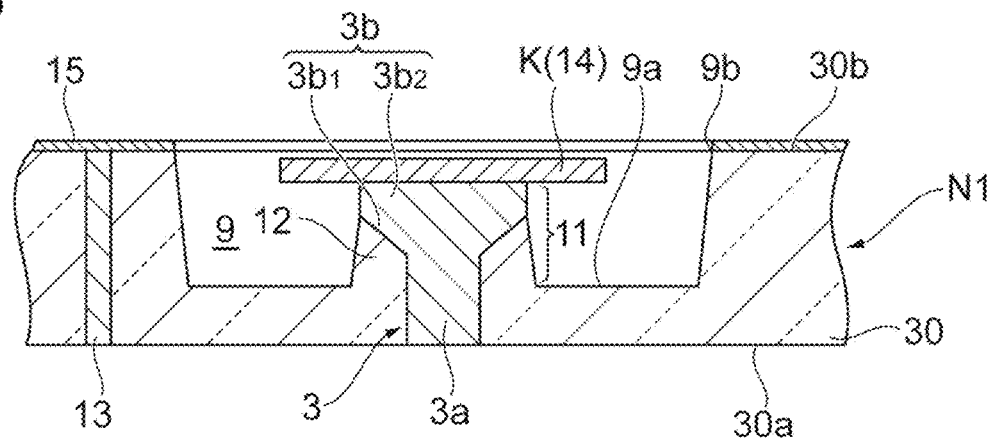
FIG. 7B is a partial cross-sectional view showing a continuation of FIG. 7A.
Figure 7C:
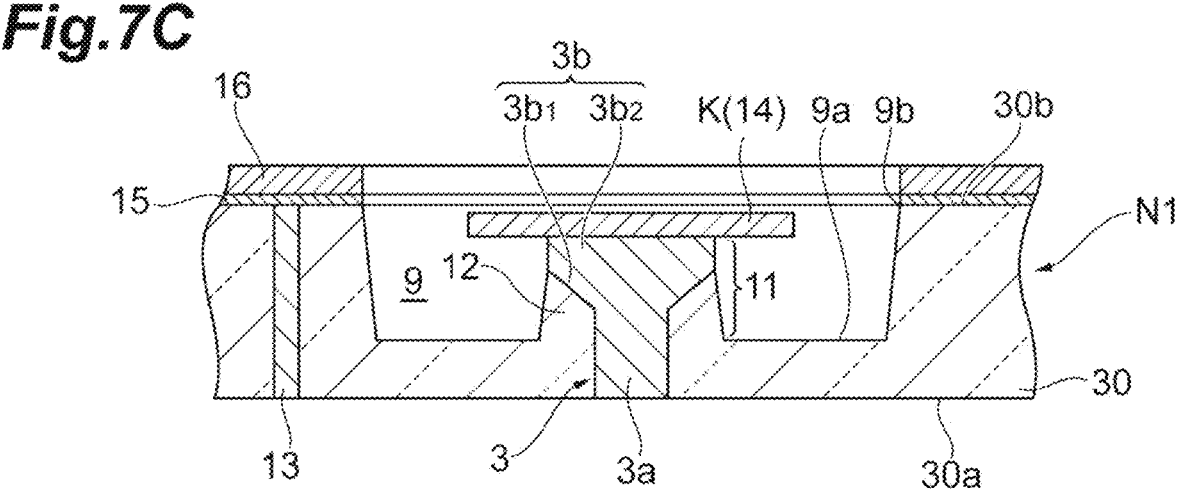
FIG. 7C is a partial cross-sectional view showing a continuation of FIG. 7B.

Subsequently, as shown in FIG. 7A, the photoelectron emitting part 14 serving as the cathode K is arranged coaxially with the penetrating member 3 and joined to a distal end face on the holding part $3b_2$ side in the penetrating member 3 in the recess 9. A method of joining the photoelectron emitting part 14 and the penetrating member 3 is not particularly limited, and the joining can be performed by laser welding, resistance welding, brazing material, or the like, for example. Subsequently, as shown in FIG. 7B, the first base film 15 is formed on the periphery of each recess 9 on the surface $30b$ of the first member 30. Then, as shown in FIG. 7C, the sealing material 16 is laminated on each of the first base films 15.

Figure 8A:
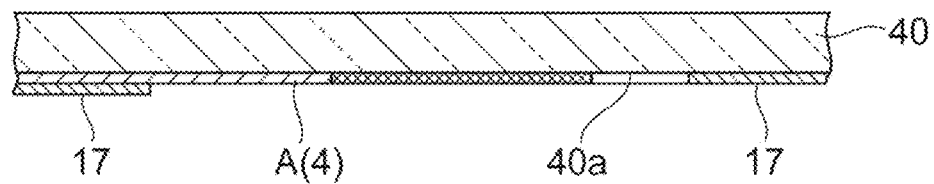
FIG. 8A is a partial cross-sectional view showing a continuation of FIG. 7C.

Subsequently, as shown in FIG. 8A, a second member 40 is prepared. The second member 40 has a flat plate shape and has dimensions of 80 mm×80 mm×1 mm, for example. The second member 40 has a surface $40a$ of a size corresponding to the first member 30 in the intermediate body N1. On the surface $40a$ of the second member 40, the counter electrode (counter electrode member) 4 is vapor-deposited at a plurality of positions corresponding to individual penetrating members 3 (photoelectron emitting parts 14) and individual power supply parts 13 of the intermediate body N1. That is, when the second member 40 is air-tightly joined to the intermediate body N1 in a subsequent stage, the counter electrode 4 is provided on the second member 40 so as to face each penetrating member 3 (photoelectron emitting part 14) and the each power supply part 13. Then, the second base film 17 is formed at a position facing the sealing material 16.

Figure 8B:
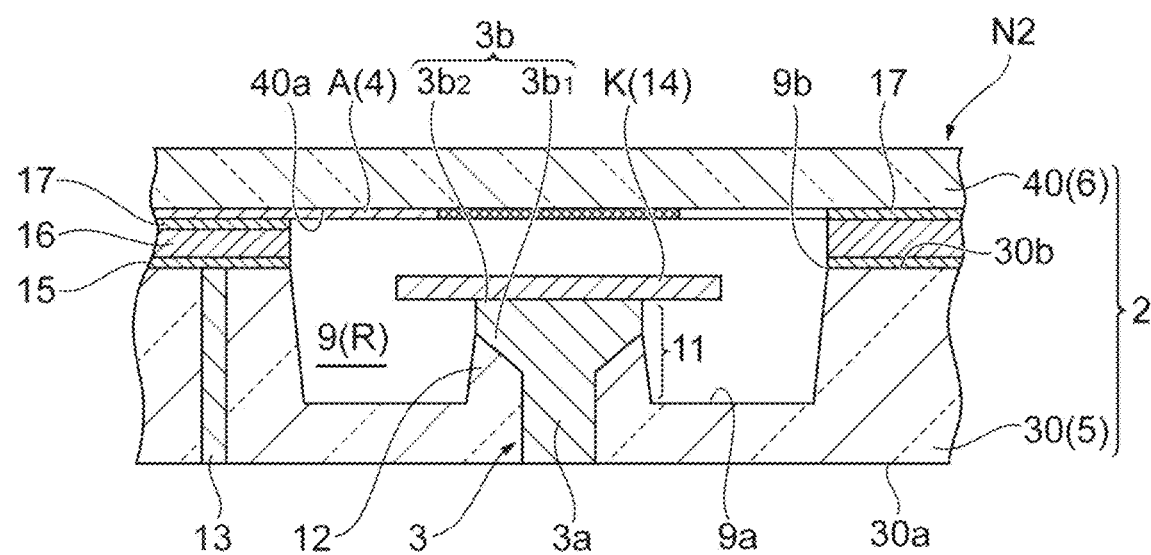
FIG. 8B is a partial cross-sectional view showing a continuation of FIG. 8A.

Subsequently, as shown in FIG. 8B, in the gas atmosphere, the second member 40 is stacked and airtightly joined on the intermediate body N1 such that the plurality of recesses 9 are hermetically sealed to form a plurality of internal spaces R enclosing gas in the surrounding atmosphere. At this time, each counter electrode 4 is opposed to each penetrating member 3 (photoelectron emitting part 14), and each counter electrode is electrically connected to each power supply part 13. Thereby, a joined body N2 is formed.

Finally, the joined body N2 is cut for each of the plurality of internal spaces R. For example, an intended cutting line is set in a grid pattern so as to pass between adjacent internal spaces R, and the joined body N2 is cut along the intended cutting line. A cutting method in the cutting step is not particularly limited, and various known cutting methods can be adopted. This causes the joined body N2 to be divided as a plurality of electron tubes 1 in which the main body part 5 is formed by the first member 30 and the lid part 6 is formed by the second member 40. Thus, the manufacture of the electron tube 1 is completed.

As described above, in the manufacturing method of the electron tube 1, it is possible to collectively mold, with use of the jig 20, a plurality of recesses 9 in which the penetrating members (conductive members) 3 passing through the first member 30 project inside, and collectively manufacture internal structures having the internal spaces R formed by the recesses 9. That is, the internal structure of the electron tube 1 can be easily manufactured.

The manufacturing method of the electron tube 1 includes, after the step of forming the joined body N, a step of cutting the joined body N2 into the plurality of electron tubes 1 so as to include at least one internal space R. This enables stable manufacturing of the plurality of electron tubes 1 having a predetermined internal structure.

In the manufacturing method of the electron tube 1, the side surface $22s$ of the protrusion 22 of the jig 20 is inclined continuously (so as to form a smooth surface) such that the protrusion 22 narrows toward the top surface $22t$ on the distal end side. In this case, it is possible to release the jig 20 while suppressing breakage of the first member 30 and the jig 20. The internal structure of the electron tube 1 can be stably manufactured.

In the manufacturing method of the electron tube 1, in a state where one end side of the penetrating member 3 projects from the protrusion 22, the protrusion 22 of the jig 20 has the holding recess $22a$ to be inserted with and hold another end side of the penetrating member 3. Between another end side of the penetrating member 3 inserted into the holding recess $22a$ and a side surface of the holding recess $22a$, the gap G is formed. In this case, since the penetrating member 3 can be covered by filling the first member 30 in the gap G, it becomes possible to stably fix the penetrating member 3 even when the penetrating member 3 is projected. Meanwhile, it suffices that the gap G is formed at least in a part between the penetrating member 3 and the side surface of the holding recess $22a$.

In the manufacturing method of the electron tube 1, the gap G1 is formed between the enlarged part $3b_1$ of the penetrating member 3 inserted and held in the holding recess $22a$ and the side surface of the holding recess $22a$. In this case, since the enlarged part $3b_1$ can be covered by filling the first member 30 in the gap G1, a contact area between the penetrating member 3 and the first member 30 can be enlarged. It is possible to stably fix the penetrating member 3 even when the penetrating member 3 is projected. Meanwhile, it suffices that the gap G1 is formed at least in a part between the enlarged part $3b_1$ and the side surface of the holding recess $22a$. Further, since the enlarged part $3b_1$ can suppress the insulating part 12 from reaching another end face of the holding part $3b_2$, electrical connection with the photoelectron emitting part 14 can be reliably secured.

In the manufacturing method of the electron tube 1, a side surface of the enlarged part $3b_1$ may be continuously inclined such that the penetrating member 3 expands toward another end side of the penetrating member 3. In this case, it is easy to cover the side surface of the enlarged part $3b_1$ with the first member 30 without a gap. It is possible to further stably fix the penetrating member 3 even when the penetrating member 3 is projected.

In the manufacturing method of the electron tube 1, an area around the protrusion 22 of the jig 20 removably holds the power supply part 13. The jig 20 is brought into contact with the first member 30 such that the power supply part 13 is embedded in the first member 30, to form the intermediate body N1 including the power supply part 13. Then, the counter electrode 4 (counter electrode member) is provided on the second member 40 so as to face the penetrating member 3, and the counter electrode 4 is electrically connected to the power supply part 13. In this case, it becomes possible to form a power supply path to the counter electrode 4 on the second member 40 side without requiring a separate step.

In the manufacturing method of the electron tube 1, the second member 40 is made of an insulating material. In this case, it becomes possible to improve the withstand voltage capability in the internal space R of the manufactured electron tube 1.

In the manufacturing method of the electron tube 1, the first member 30 is polished until one ends of the penetrating member 3 and the power supply part 13 are exposed from the first member 30. In this case, it is possible to realize a configuration in which the penetrating member 3 and the power supply part 13 pass through the first member 30.

In the electron tube 1, the withstand voltage capability in the internal space R can be enhanced since a contact area with the housing 2 in the internal space R can be reduced as compared with a case of using, for example, a conductive film or the like provided along an inner wall surface of the housing, by using the penetrating member 3 having the internal space projecting part 11 for electrical connection with the cathode K. Further, since the recess 9 expands toward the opening 9b side, it is possible to easily release a mold in a case where the main body part 5 is molded using the jig 20 (mold). Therefore, according to the electron tube 1, the withstand voltage capability can be improved and manufacturing can be easily performed.

In the electron tube 1, the main body part 5 includes the first plate-shaped part 7 and the frame-shaped side wall part 8 provided on the first plate-shaped part 7. The lid part 6 includes the second plate-shaped part 10 fixed on the side wall part 8 and facing the first plate-shaped part 7. The penetrating member 3 passes through the first plate-shaped part 7. According to this configuration, in the electron tube 1 including the housing 2 in which the first plate-shaped part 7 and the second plate-shaped part 10 are facing each other, it is possible to stably fix the penetrating member 3, so that a small electron tube 1 can be concretely and easily realized.

In the electron tube 1, the side surface 9c of the recess 9 is continuously inclined such that the recess 9 expands toward the opening 9b side. According to this configuration, it is possible to stably form the main body part 5 having the recess 9 of a fixed shape.

In the electron tube 1, a part of a side surface of the internal space projecting part 11 of the penetrating member 3 is covered with the insulating part 12 made of an insulating material. According to this configuration, it is possible to reduce an exposure of the penetrating member 3 in the internal space R, and improve the withstand voltage capability in the internal space R.

In the electron tube 1, the cathode K (photoelectron emitting part 14) is held at the distal end side of the internal space projecting part 11 of the penetrating member 3, and the internal space projecting part 11 has the enlarged part $3b_1$ expanding toward the distal end side. According to this configuration, it is possible to enlarge a cross-sectional area (to provide the holding part $3b_2$) of the distal end side holding the cathode K (photoelectron emitting part 14) in the internal space projecting part 11.

In the electron tube 1, the enlarged part $3b_1$ is covered with the insulating part 12. According to this configuration, it is possible to reduce an exposure of the enlarged part $3b_1$ in the internal space R, and improve the withstand voltage capability in the internal space R. On the other hand, since the enlarged part $3b_1$ can suppress the insulating part 12 from reaching another end face of the holding part $3b_2$, electrical connection with the photoelectron emitting part 14 can be reliably secured.

In the electron tube 1, a side surface of the enlarged part $3b_1$ is continuously inclined such that the penetrating member 3 expands toward the distal end side. According to this configuration, it is easy to cover the side surface of the enlarged part $3b_1$ with the insulating part 12 without a gap, and it is easy to realize improvement of the withstand voltage capability in the internal space R.

The electron tube 1 further includes the counter electrode 4 provided on the lid part 6 so as to face the penetrating member 3, and the counter electrode 4 is electrically connected to the power supply part 13 passing through the main body part 5 without being exposed in the internal space R. According to this configuration, it is possible to reduce an exposure, in the internal space R, of the power supply part 13 electrically connected to the counter electrode 4, and improve the withstand voltage capability in the internal space R.

In the electron tube 1, the lid part 6 is made of an insulating material having light transmittance. According to this configuration, it is possible to further improve the withstand voltage capability in the internal space R, while configuring the lid part 6 as a window part for light reception in the internal space R.

In the present embodiment, the steps shown in FIGS. 4A to 5A constitute a first step. The steps shown in FIGS. 5B to 7C constitute a second step. The steps shown in FIGS. 8A to 8B constitute a third step. A step of cutting the joined body N2 for each of the plurality of internal spaces R constitutes a fourth step.

Second Embodiment

Next, a second embodiment will be described. In the description of the third embodiment, points different from the first embodiment above will be described, and similar description will be omitted.

Figure 9:
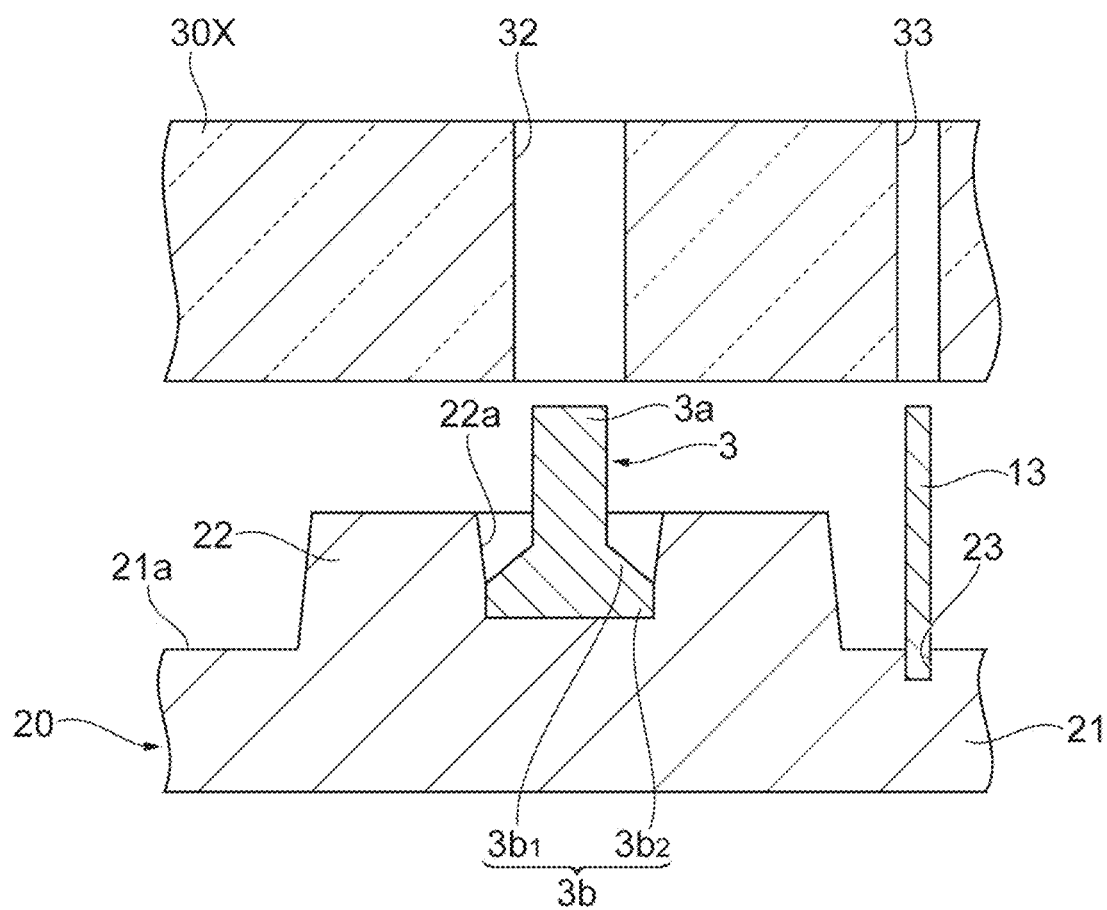
FIG. 9 is a partial cross-sectional view illustrating a manufacturing method of an electron tube according to a second embodiment.

As shown in FIG. 9, the second embodiment is different from the first embodiment in that a first member 30X is used in place of the first member 30 (see FIG. 5A) in a manufacturing method of an electron tube. The first member 30X is similar to the first member 30 except that a through hole 32 and a through hole 33 are provided at positions facing a penetrating member 3 and a power supply part 13. An inner diameter of the through hole 32 corresponds to an outer diameter of a columnar part 3a of the penetrating member 3, and an inner diameter of the through hole 33 corresponds to an outer diameter of the power supply part 13. However, the inner diameter of the through holes 32 and 33 may be slightly larger than the outer diameters.

In the manufacturing method using the first member 30X, when the first member 30X and a jig 20 are arranged at positions facing each other, the through hole 32 is opposed to the penetrating member 3 and the through hole 33 is opposed to the power supply part 13. Then, the plurality of protrusions 22, the penetrating member 3, and the power supply part 13 are embedded in the first member 30X by bringing the jig 20 and the first member 30X close to and into contact with each other to press either one of the jig 20 and the first member 30X against the other (or each other). At that time, the penetrating member 3 is inserted into the through hole 32 and the power supply part 13 is inserted into the through hole 33.

As described above, the manufacturing method of the electron tube according to the second embodiment also achieves effects similar to those of the above-described embodiment. In addition, by using the first member 30X having the through hole 32 and the through hole 33, it is possible to suppress the first member 30X from adhering to the one end faces of the penetrating member 3 and the power supply part 13 exposed from the first member 30X, that is, a surface of an electrical connection part when power is supplied to the penetrating member 3 and the power supply part 13. In addition, since one end sides of the penetrating member 3 and the power supply part 13 are smoothly introduced into the first member 30X, it is possible to suppress a change of the arrangement of the penetrating member 3 and the power supply part 13 in embedding in the first member 30X.

Third Embodiment

Next, a third embodiment will be described. In the description of the third embodiment, points different from the first embodiment above will be described, and similar description will be omitted.

Figure 10A:
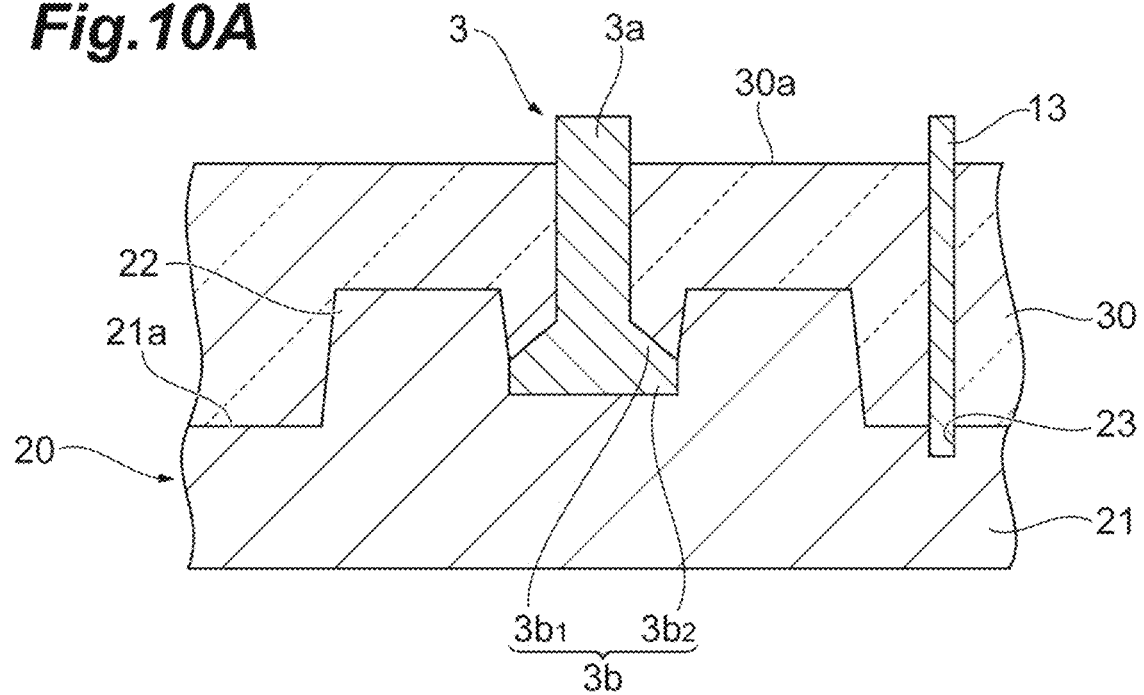
FIG. 10A is a partial cross-sectional view illustrating a manufacturing method of an electron tube according to a third embodiment.
Figure 10B:
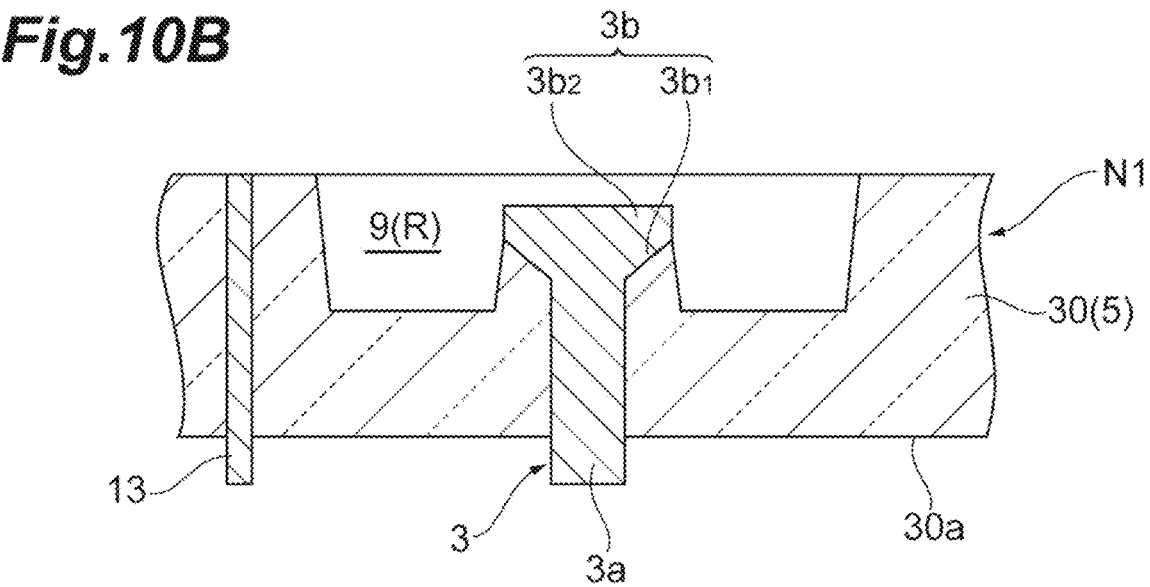
FIG. 10B is another partial cross-sectional view illustrating the manufacturing method of the electron tube according to the third embodiment.

As shown in FIG. 10A, the third embodiment is different from the first embodiment in that, in a manufacturing method of an electron tube, one ends of a penetrating member 3 and a power supply part 13 are exposed from a first member 30 such that the penetrating member 3 and the power supply part 13 pass through the first member 30 in embedding the penetrating member 3 and the power supply part 13 in the first member 30. This causes, as shown in FIG. 10B, one ends of the penetrating member 3 and the power supply part 13 to project from a surface 30a of the first member 30 in an intermediate body N1 of the third embodiment. As a result, in the electron tube according to the third embodiment, one ends of the penetrating member 3 and the power supply part 13 project outward (atmosphere side) from a main body part 5.

As described above, the manufacturing method of the electron tube according to the third embodiment also achieves effects similar to those of the above-described embodiment. Further, since one ends of the penetrating member 3 and the power supply part 13 are exposed from the first member 30 such that the penetrating member 3 and the power supply part 13 pass through the first member 30, it is possible to eliminate necessity of polishing of the surface 30a of the first member 30 after embedding in the first member 30, enabling a manufacturing step to be simplified. Further, since one ends of the penetrating member 3 and the power supply part 13 project, it is possible to facilitate electrical connection, and in turn, power supply, to the penetrating member 3 and the power supply part 13. In addition, using the first member 30X used in the second embodiment as the first member 30 makes it possible to suppress adhesion of the first member 30X to the surface of the electrical connection part when power is supplied to the penetrating member 3 and the power supply part 13.

Note that the present embodiment may include at least a part of the features of other embodiments or modifications in place of or in addition to the features of the first embodiment above.

Fourth Embodiment

Next, a fourth embodiment will be described. In the description of the fourth embodiment, points different from the first embodiment above will be described, and similar description will be omitted.

Figure 11A:
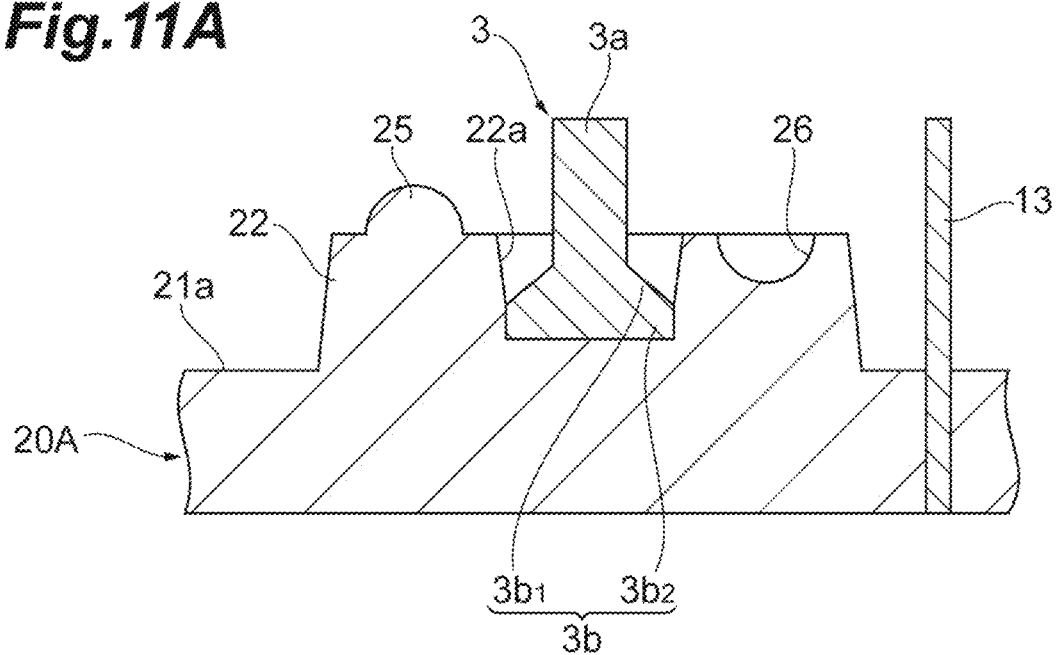
FIG. 11A is a partial cross-sectional view illustrating a manufacturing method of an electron tube according to a fourth embodiment.

As shown in FIG. 11A, the fourth embodiment is different from the first embodiment in that a jig 20A is used in place of the jig 20 (see FIG. 4B) in a manufacturing method of an electron tube. The jig 20A is similar to the jig 20 except that a protrusion 25 and a recess 26 are formed on a distal end face of a protrusion 22.

Figure 11B:
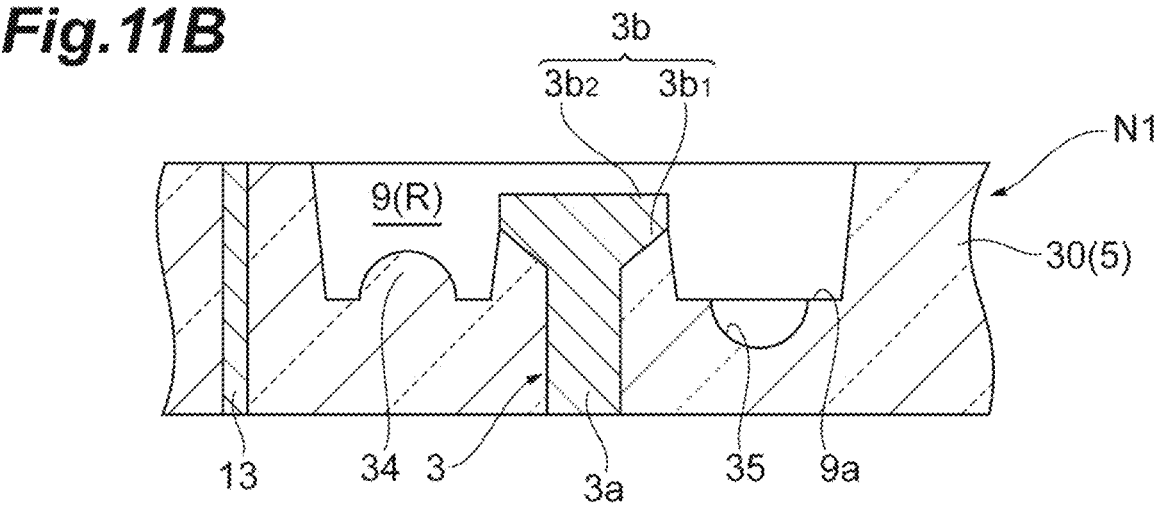
FIG. 11B is another partial cross-sectional view illustrating the manufacturing method of the electron tube according to the fourth embodiment.

As shown in FIG. 11B, in an intermediate body N1 according to the manufacturing method using the jig 20A, on a bottom surface 9a of a recess 9, a protrusion 34 corresponding to the recess 26 is forming and a recess 35 corresponding to the protrusion 25 is formed. As a result, in the electron tube according to the fourth embodiment, the protrusion 34 and the recess 35 are formed on the bottom surface 9a of the recess 9 constituting an internal space R.

As described above, the manufacturing method of the electron tube according to the fourth embodiment also achieves effects similar to those of the above-described embodiment. Further, by forming the protrusion 34 and the recess 35 on the bottom surface 9a of the recess 9, it is possible to lengthen a creepage distance in the internal space R, specifically, a creepage distance between an anode A (counter electrode 4), and a cathode K (photoelectron emitting part 14) and a penetrating member 3, and to further improve the withstand voltage capability in the internal space R. Particularly, the recess 35 can increase an enclosed volume of gas, making it possible to improve a service life of the electron tube 1.

Note that, in the jig 20A, the protrusion 25 and the recess 26 are formed on the distal end face of the protrusion 22, but it suffices that at least one of a recess, a protrusion, and a rough surface part is formed on at least a part of a surface constituting the protrusion 22. Similarly, in the electron tube according to the fourth embodiment, the protrusion 34 and the recess 35 are formed on the bottom surface 9a of the recess 9, but it suffices that at least one of a recess, a protrusion, and a rough surface part is formed on at least a part of a surface constituting the internal space R. The rough surface part is a rougher surface than a predetermined roughness, and is a surface on which fine unevenness is formed, such as satin, for example. The present embodiment may include at least a part of the features of other embodiments or modifications in place of or in addition to the features of the first embodiment above.

Fifth Embodiment

Next, a fifth embodiment will be described. In the description of the fifth embodiment, points different from the fourth embodiment above will be described, and similar description will be omitted.

Figure 12A:
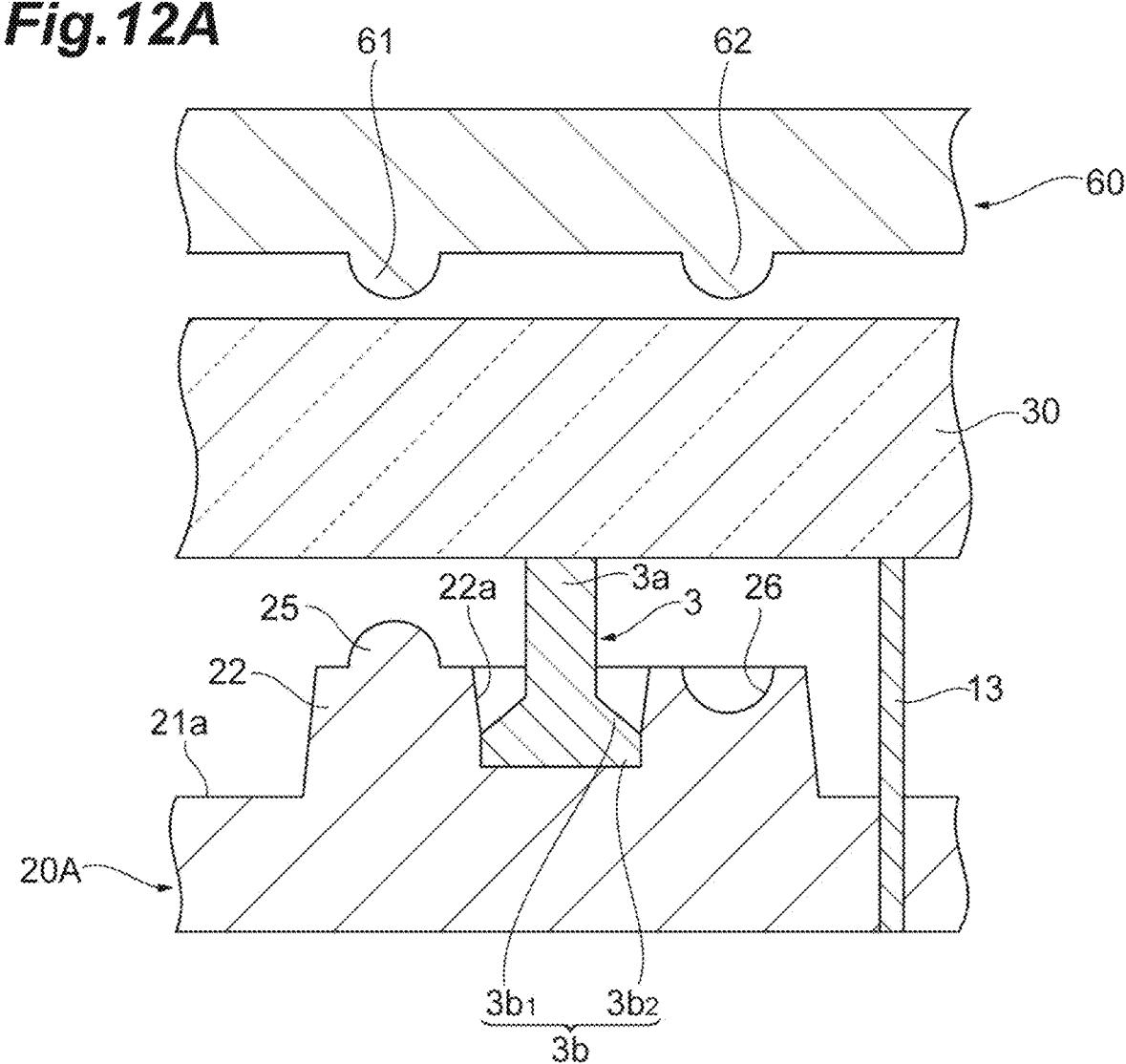
FIG. 12A is a partial cross-sectional view illustrating a manufacturing method of an electron tube according to a fifth embodiment.

As shown in FIG. 12A, the fifth embodiment is different from the fourth embodiment in that, in a manufacturing method of an electron tube, a plurality of protrusions 61 and 62 are provided in a pressing member 60 that presses a first member 30 in bringing a jig 20A and the first member 30 close to and into contact with each other to press either one of the jig 20A and the first member 30 against the other (or each other).

The plurality of protrusions 61 and 62 are formed in a contact region of the pressing member 60 with the first member 30. The protrusion 61 is provided at a position facing a protrusion 25 of the jig 20A via the first member 30. The protrusion 62 is provided at a position facing a recess 26 of the jig 20A via the first member 30.

Figure 12B:
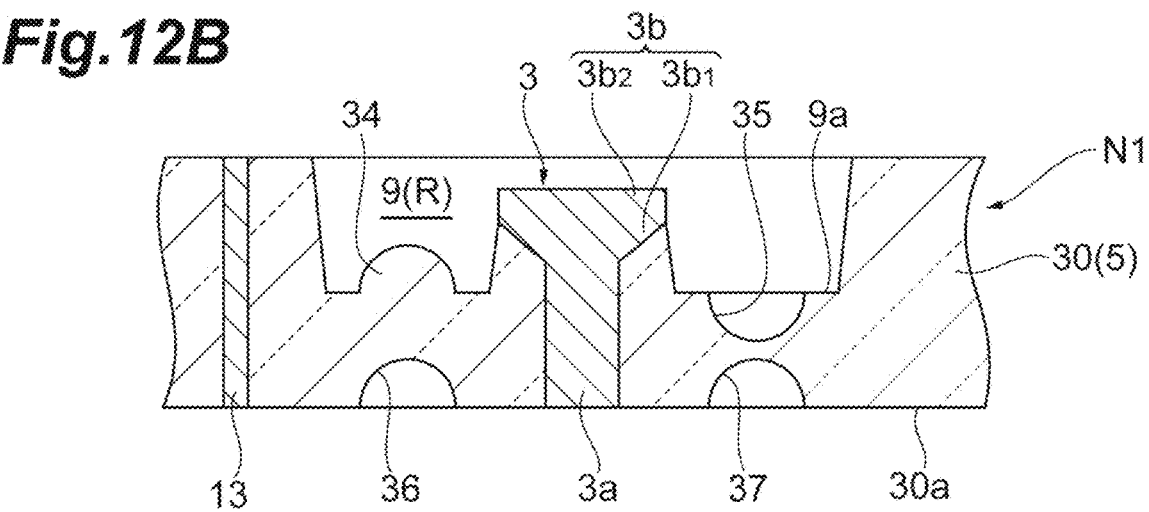
FIG. 12B is another partial cross-sectional view illustrating the manufacturing method of the electron tube according to the fifth embodiment.

As shown in FIG. 12B, in an intermediate body N1 according to the manufacturing method using the pressing member 60, a recess 36 and a recess 37 are formed on a surface 30a of the first member 30 on a side opposite to an opening 9b side of a recess 9. The recess 36 is formed by the protrusion 62. The recess 37 is formed by the protrusion 61. As a result, in the electron tube according to the fifth embodiment, the recess 36 and the recess 37 are formed on an outer surface on a side (atmosphere side) opposite to the opening 9b side of the recess 9 in a main body part 5.

As described above, the manufacturing method of the electron tube according to the fifth embodiment also achieves effects similar to those of the above-described embodiment. Further, by forming the recess 36 and the recess 37 on the surface of the main body part 5, it is possible to lengthen a creepage distance between an exposed part (base end face) of a penetrating member 3 and the exposed part (base end face) of a power supply part 13 on an outer surface of the electron tube 1, and improve the withstand voltage capability.

Note that, in the pressing member 60, the protrusion 61 and the protrusion 62 are formed in the contact region with the first member 30, but it suffices that at least one of a recess, a protrusion, and a rough surface part is formed. Similarly, in the electron tube according to the fifth embodiment, the recess 36 and the recess 37 are formed on the surface of the main body part 5, but it suffices that at least one of a recess, a protrusion, or a rough surface part is formed on at least a part of an outer surface of the main body part 5. In addition, the jig 20 (see FIG. 4B) may be used in place of the jig 20A, and a protrusion 34 and a recess 35 on a bottom surface 9*a* of the recess 9 may be omitted.

Figure 13A:
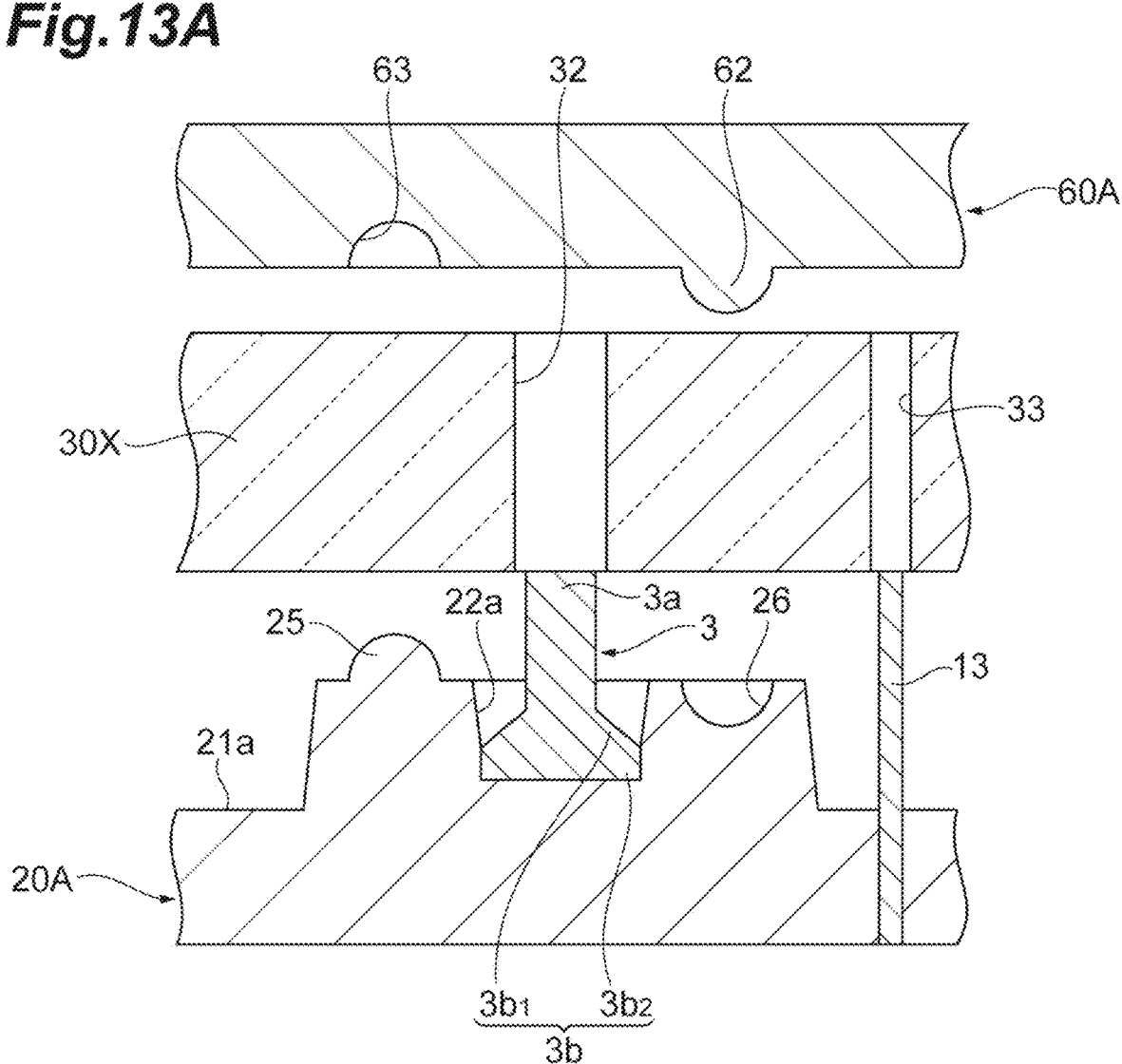
FIG. 13A is a partial cross-sectional view illustrating a manufacturing method of an electron tube according to a modification of the fifth embodiment.

The present embodiment may include at least a part of the features of other embodiments or modifications in place of or in addition to the features of the fourth embodiment above. For example, as shown in FIG. 13A, in the manufacturing method according to the present embodiment, the first member 30X of the second embodiment may be used in place of the first member 30 (see FIG. 12A).

Figure 13B:
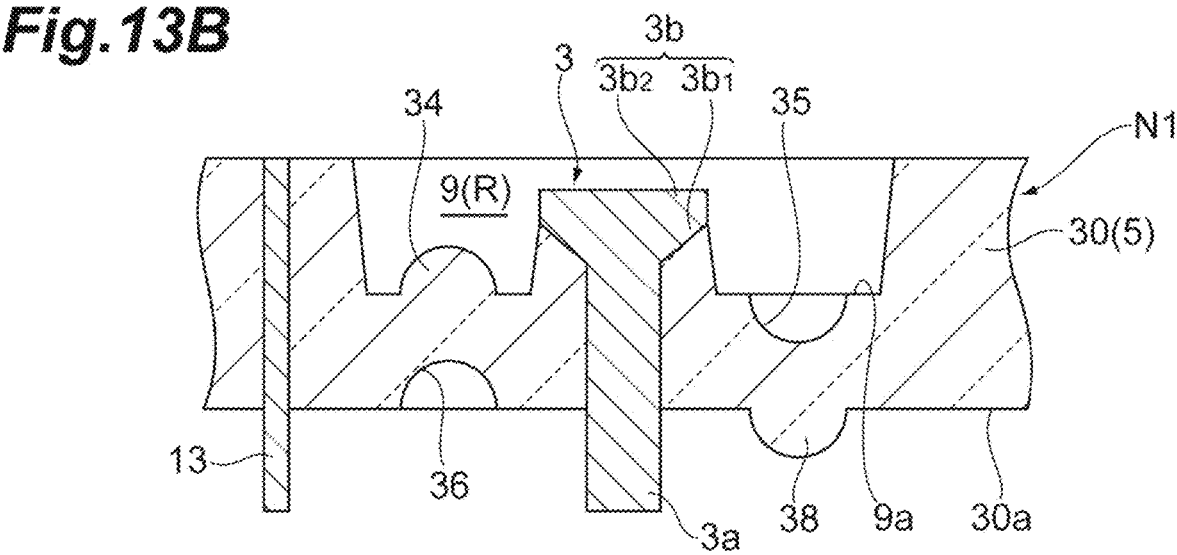
FIG. 13B is another partial cross-sectional view illustrating the manufacturing method of the electron tube according to the modification of the fifth embodiment.

In addition, for example, in place of the pressing member 60 (see FIG. 12A) formed with the protrusion 61 and the protrusion 62, a pressing member 60A formed with a protrusion 62 and a recess 63 may be used. In this case, as shown in FIG. 13B, in the electron tube according to the present embodiment, on the surface of the main body part 5, on a side (atmosphere side) opposite to the opening 9*b* side of the recess 9, a recess 36 is formed by the protrusion 62 and a protrusion 38 is formed by the recess 63.

Further, for example, in the manufacturing method according to the present embodiment, similarly to the third embodiment, the penetrating member 3 and the power supply part 13 may be embedded with one ends of the penetrating member 3 and the power supply part 13 exposed from the first member 30 such that the penetrating member 3 and the power supply part 13 pass through the first member 30, in embedding the penetrating member 3 and the power supply part 13 in the first member 30. In the electron tube according to the present embodiment, one ends of the penetrating member 3 and the power supply part 13 may project from the surface 30*a* of the first member 30.

Although the embodiments have been described above, one aspect of the present invention is not limited to the above embodiments.

Figure 14A:
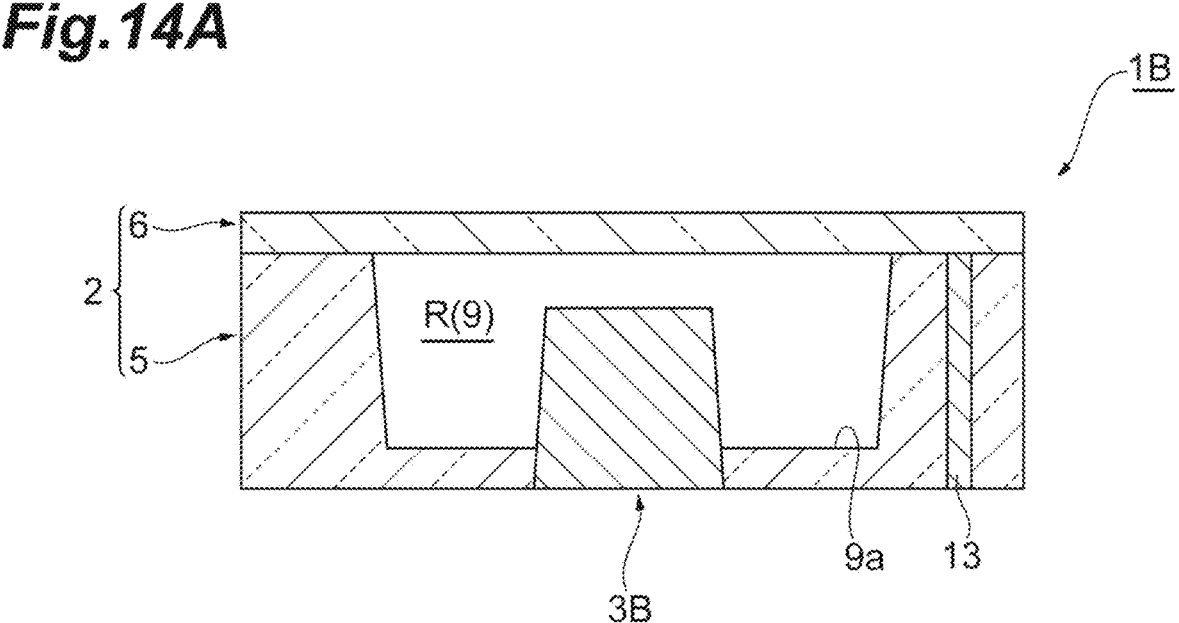
FIG. 14A is a cross-sectional view of an electron tube according to a first modification.

The electron tube to be manufactured may have the following configuration. For example, similarly to an electron tube 1B shown in FIG. 14A, a penetrating member 3B may be provided in place of the penetrating member 3 (see FIG. 1). The penetrating member 3B does not have the enlarged part 3*b*$_1$ and the holding part 3*b*$_2$ (see FIG. 1). The penetrating member 3B is continuously inclined such that a diameter of the penetrating member 3B decreases toward the distal end side over the entire extending direction thereof, and passes through the main body part 5 of the housing 2 and projects into the internal space R from the bottom surface 9*a* of the recess 9. In addition, a distal end face of the penetrating member 3B is made to function as the cathode K without separately providing the photoelectron emitting part 14. That is, since the cathode K (electrode) is integrally formed with the penetrating member 3B, the number of manufacturing steps is reduced and the electron tube 1 can be manufactured more easily. In addition, since there is no joint part, an electrode with excellent earthquake resistance can be obtained.

Figure 14B:
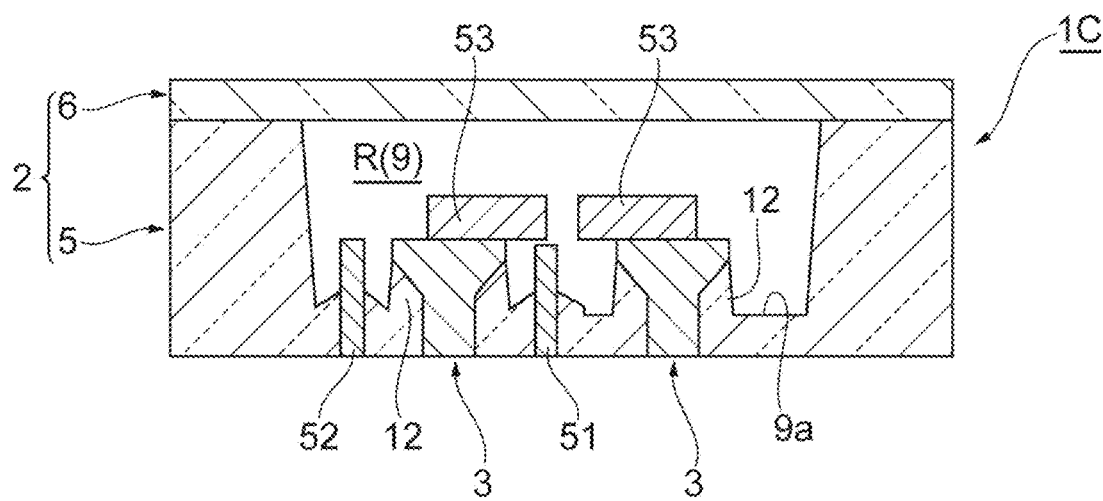
FIG. 14B is a cross-sectional view of an electron tube according to a second modification.

In addition to being applicable as an ultraviolet detector as in the above embodiment, the electron tube to be manufactured can be applied as a light source or the like as a light emitting element (energy generating element). For example, an electron tube 1C shown in FIG. 14B has a structure as a discharge lamp. In the electron tube 1C, a pair of penetrating members 3 are arranged in one internal space R, metal parts 53 serving as the cathode K and the anode A are attached to respective distal end sides of the penetrating members 3, and discharging between both electrodes enables operation as a lamp. The electron tube 1C includes a probe pin 51 and a sparker pin 52 that pass through the main body part 5 and project into the internal space R, for discharge. The metal part 53, the probe pin 51, and the sparker pin 52 serve as electrodes for emission of light.

Figure 15A:
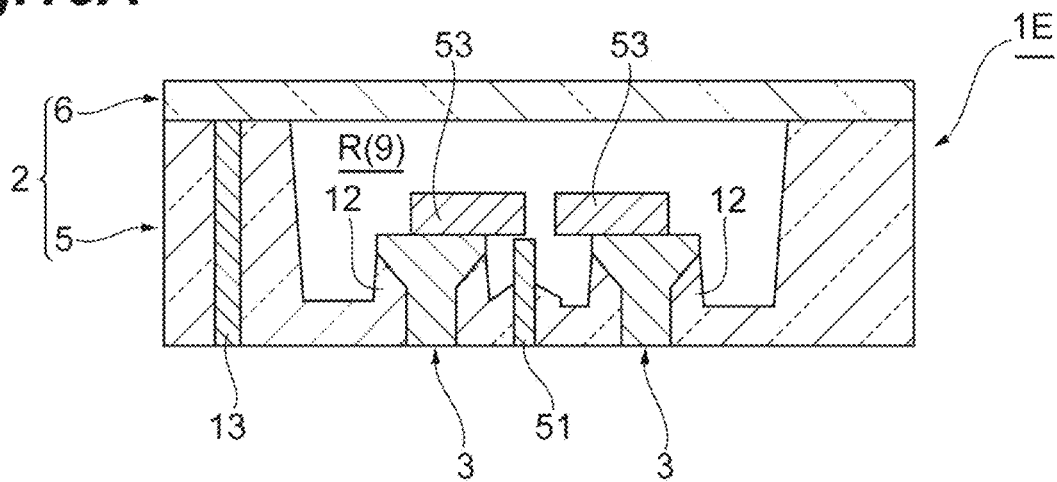
FIG. 15A is a cross-sectional view of an electron tube according to a third modification.

Further, for example, an electron tube 1E shown in FIG. 15A has a structure as a discharge lamp. In the electron tube 1E, a pair of penetrating members 3 are arranged in one internal space R, metal parts 53 serving as the cathode K and the anode A are attached to respective distal end sides of the penetrating members 3, and discharging between both electrodes enables operation as a lamp. The electron tube 1E includes a probe pin 51 passing through the main body part 5 and projecting into the internal space R for discharge, a sparker electrode (not shown) provided on the inner surface of the lid part 6 and electrically connected to the power supply part 13. The metal part 53, the probe pin 51, and the sparker electrode serve as electrodes for emission of light.

Figure 15B:
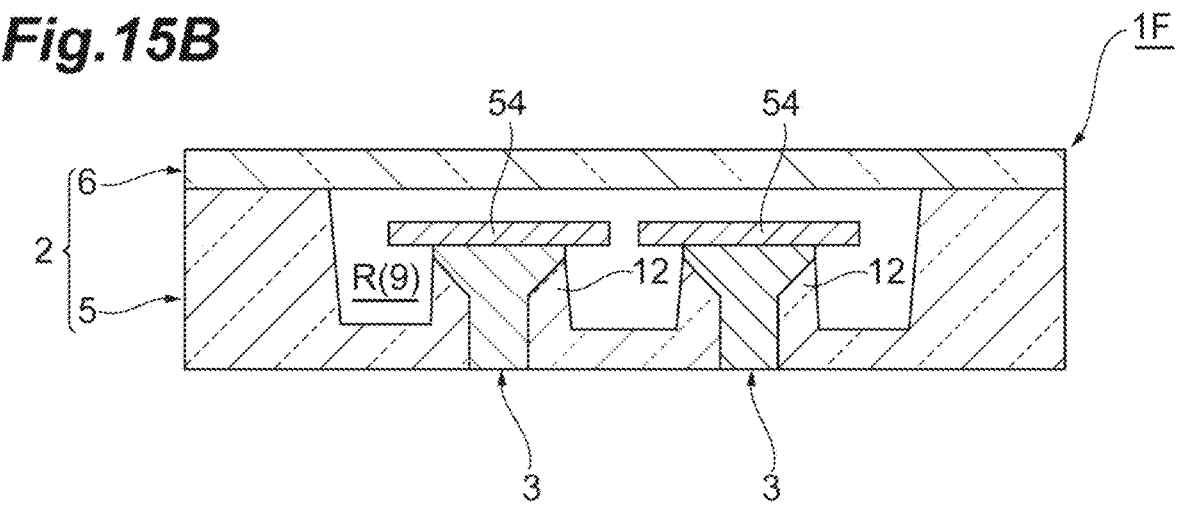
FIG. 15B is a cross-sectional view of an electron tube according to a fourth modification.

Further, for example, an electron tube 1F shown in FIG. 15B has a structure as a discharge lamp. In the electron tube 1F, a pair of penetrating members 3, metal parts 54 serving as the cathode K and the anode A are disposed in one internal space R, and discharging between both electrodes enables operation as a lamp. In the present embodiment, the metal parts 54 alone serve as electrodes for emission of light.

Figure 15C:
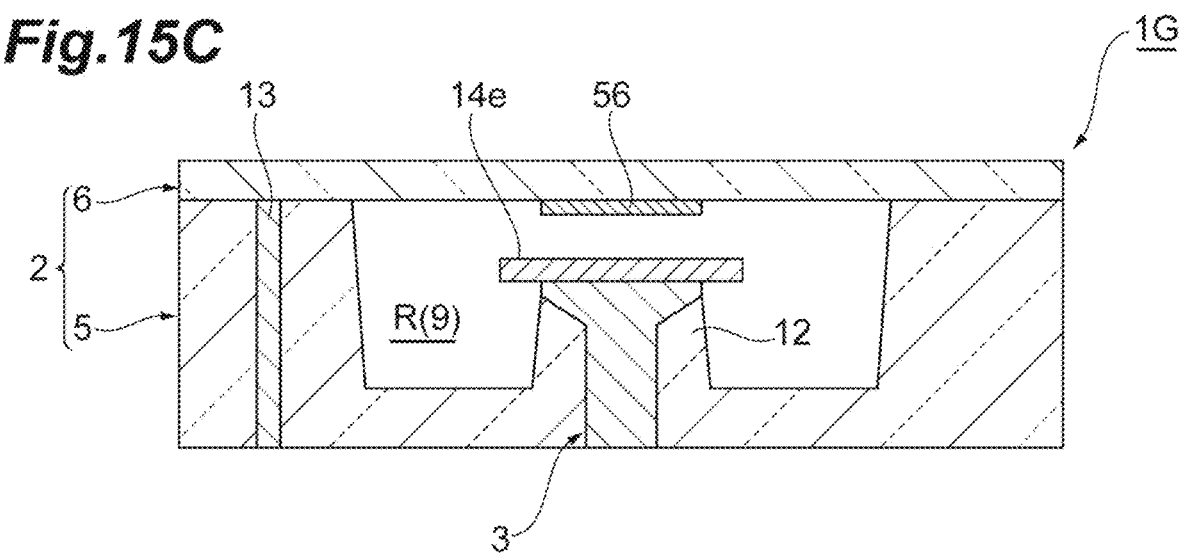
FIG. 15C is a cross-sectional view of an electron tube according to a fifth modification.

Further, for example, an electron tube 1G shown in FIG. 15C has an electron source structure. In the electron tube 1G, in a state where a target material 56 is arranged facing to an emitter 14*e* fixed to the distal end side of the penetrating member 3, a predetermined voltage is applied between the target material 56 and the emitter 14*e* to form such an electric field that leads electrons emitted from the emitter 14*e* to the target material 56. For example, in a case where the target material 56 is a phosphor, causing collision of electrons allows fluorescent light emission to be generated. Further, changing the target material 56 to various materials enables X-rays to be generated and electron beams to be transmitted. During operation, the internal space R is evacuated. The emitter 14*e* serves as an electrode for generation of energy.

In the above embodiment, the sealing material 16 is provided on the first base film 15 of the first member 30 (see FIG. 7C). Alternatively, the sealing material 16 may be provided on the second base film 17 of the second member 40. Further, in a case where frit glass is used for the sealing material 16, the first base film 15 and the second base film 17 may be omitted.

In the above embodiment, the power supply part 13 is provided on the periphery of the recess 9 in the main body part 5, but the position of the power supply part 13 is not limited. It suffices that the power supply part 13 is provided on the main body part 5 so as to pass through the surface 30*b* from the surface 30*a* of the first member 30 (pass through inside the first plate-shaped part 7 and the side wall part 8).

For example, a raised part may be provided at one corner among four corners of the recess 9 such that the side surface of the recess 9 bulges inward, and the power supply part 13 may be provided so as to pass through the raised part. In the above embodiment, the insulating part 12 is formed integrally with the main body part 5, but the insulating part 12 may be formed separately from the main body part 5.

In the above embodiment, a part of the side surface of the internal space projecting part 11 is covered with the insulating part 12. However, it suffices that at least a part of the side surface of the internal space projecting part 11 is covered with the insulating part 12. In the above embodiment, all of the enlarged part $3b_1$ is covered with the insulating part 12, but it suffices that at least a part of the enlarged part $3b_1$ is covered with the insulating part 12. Further, the penetrating member 3 has the cylindrical holding part $3b_2$ at distal end thereof. However, the penetrating member 3 may be provided with a continuous inclined surface from the enlarged part $3b_1$ to the distal end without having a cylindrical part. In addition, the electron tube 1 has one recess 9 alone, but single electron tube may have a plurality of recesses 9. In this case, it is also possible to use a single electron tube in a state of not being divided. In this case, the internal spaces R in the plurality of recesses 9 may be independent of each other or may be in communication with each other. In this case, an electron tube having a desired area can be easily obtained. In the above embodiments, the materials, shapes, and dimensions of the individual configurations are not limited to the above-described materials, shapes, and dimensions, and various materials, shapes, and dimensions can be adopted.

According to one aspect of the present invention, it is possible to provide a manufacturing method of an electron tube that can easily manufacture an internal structure of the electron tube.

What is claimed is:

1. A manufacturing method of an electron tube, the manufacturing method comprising:
   a first step of preparing a first member made of an insulating material and a jig provided with a protrusion, the protrusion being juxtaposed, narrowing toward a distal end side, and removably holding a conductive member, and heating at least one of the first member and the jig to a temperature at which the first member can melt and deform;
   after the first step, a second step of bringing the jig into contact with the first member to allow a plurality of the protrusions to be embedded in the first member in a state where the first member and the plurality of the protrusions are facing each other, removing the jig, and forming an intermediate body, the intermediate body including the first member in which a plurality of recesses expanding toward an opening side are formed corresponding to the plurality of the protrusions, and including a plurality of the conductive members passing through the first member and projecting into the recesses; and
   after the second step, a third step of preparing a second member, hermetically joining the second member to the intermediate body by closing openings of the plurality of recesses to form a plurality of internal spaces where electron is emitted, and forming a joined body.

2. The manufacturing method of an electron tube according to claim 1, further comprising, after the third step, a fourth step of cutting the joined body into a plurality of electron tubes to have at least one of the internal spaces.

3. The manufacturing method of an electron tube according to claim 1, wherein a side surface of the protrusion of the jig is continuously inclined to allow the protrusion to narrow toward a distal end side.

4. The manufacturing method of an electron tube according to claim 1, wherein the protrusion of the jig has a holding recess configured to hold, in a state where one end side of the conductive member projects from the protrusion, another end side of the conductive member; and
   a gap is formed at least in a part between another end side of the conductive member held in the holding recess and a side surface of the holding recess.

5. The manufacturing method of an electron tube according to claim 4, wherein another end side of the conductive member held in the holding recess has an enlarged part expanding toward the another end side; and a gap is formed in at least a part between the enlarged part and a side surface of the holding recess.

6. The manufacturing method of an electron tube according to claim 5, wherein a side surface of the enlarged part is continuously inclined to allow the conductive member to expand toward the another end side of the conductive member.

7. The manufacturing method of an electron tube according to claim 1, wherein an area around the protrusion of the jig removably holds a power supply member;
   in the second step, the jig is brought into contact with the first member to allow the power supply member to be further embedded in the first member, to form the intermediate body further including the power supply member; and
   in the third step, a counter electrode member is provided on the second member to face the conductive member projecting into each of the recesses, and the counter electrode member is electrically connected to the power supply member.

8. The manufacturing method of an electron tube according to claim 1, wherein the second member is made of an insulating material.

9. The manufacturing method of an electron tube according to claim 1, wherein at least one of a recess, a protrusion, or a rough surface part is formed on at least a part of a surface constituting the protrusion of the jig.

10. The manufacturing method of an electron tube according to claim 1, further comprising, after the first step, a step of pressing, with a pressing member, a side opposite to a side to be in contact with the jig in the first member, wherein
    at least one of a recess, a protrusion, or a rough surface part is formed in a contact region of the pressing member with the first member.

11. The manufacturing method of an electron tube according to claim 1, wherein, in the second step, the conductive member is embedded in the first member while exposing one end of the conductive member from the first member to allow the conductive member to pass through the first member in the intermediate body, or the first member is polished until one end of the conductive member is exposed from the first member.

* * * * *